United States Patent
Stewart

(10) Patent No.: US 11,803,599 B2
(45) Date of Patent: Oct. 31, 2023

(54) APPARATUS AND METHOD FOR ATTRIBUTE DATA TABLE MATCHING

(71) Applicant: MY JOB MATCHER, INC., Austin, TX (US)

(72) Inventor: Arran Stewart, Austin, TX (US)

(73) Assignee: MY JOB MATCHER, INC., Austin, TX (US)

( * ) Notice: Subject to any disclaimer, the term of this patent is extended or adjusted under 35 U.S.C. 154(b) by 0 days.

(21) Appl. No.: 17/694,803

(22) Filed: Mar. 15, 2022

(65) Prior Publication Data

US 2023/0297633 A1    Sep. 21, 2023

(51) Int. Cl.
*G06F 16/953* (2019.01)
*G06F 16/951* (2019.01)

(52) U.S. Cl.
CPC .......... *G06F 16/953* (2019.01); *G06F 16/951* (2019.01)

(58) Field of Classification Search
CPC .............................. G06F 16/953; G06F 16/951
USPC ...................................................... 707/709
See application file for complete search history.

(56) References Cited

U.S. PATENT DOCUMENTS

| | | | | |
|---|---|---|---|---|
| 6,701,313 B1 * | 3/2004 | Smith | ................... | G06F 16/289 |
| 8,244,551 B1 * | 8/2012 | Mund | ................... | G06Q 10/10 |
| | | | | 705/320 |
| 9,449,300 B2 * | 9/2016 | Kalscheuer | ............ | G06Q 10/10 |
| 10,679,187 B2 | 6/2020 | Kenthapadi et al. | | |
| 10,776,757 B2 | 9/2020 | Fang | | |
| 11,080,336 B2 * | 8/2021 | Van Dusen | ............ | G06Q 50/01 |
| 11,144,882 B1 * | 10/2021 | Olshansky | ................ | H04N 7/144 |
| 11,423,071 B1 * | 8/2022 | Olshansky | ............ | G06F 16/387 |
| 11,507,901 B1 * | 11/2022 | Stewart | .......... | G06Q 10/063112 |
| 11,556,898 B1 * | 1/2023 | Stewart | ................. | H04L 9/3236 |
| 11,562,032 B1 * | 1/2023 | Stewart | ................. | G06Q 50/01 |
| 2004/0186743 A1 * | 9/2004 | Cordero, Jr. | ........ | G06Q 10/1053 |
| | | | | 705/321 |
| 2005/0283717 A1 * | 12/2005 | Giraldo | ................... | G06Q 10/00 |
| | | | | 715/205 |
| 2007/0038636 A1 * | 2/2007 | Zanghi, Jr. | ............. | G06Q 10/10 |
| 2008/0027747 A1 * | 1/2008 | McGovern | ............ | G06Q 10/06 |
| | | | | 705/321 |
| 2008/0162569 A1 * | 7/2008 | Schifone | ............ | G06Q 10/1053 |

(Continued)

OTHER PUBLICATIONS

May Fern Koh, Yewchoong Chew, Intelligent job matching with self-learning recommendation engine, Dec. 31, 2015.

*Primary Examiner* — Mark E Hershley
(74) *Attorney, Agent, or Firm* — CALDWELL INTELLECTUAL PROPERTY LAW

(57) ABSTRACT

In an aspect an apparatus for attribute data table matching is presented. An apparatus includes at least a processor. An apparatus includes a memory communicatively connected to at least a processor. A memory contains instructions configured at least a processor to receive an attribute data table from a user. A processor is configured to query an opportunity posting database as a function of a received attribute data table. A processor is configured to select an opportunity posting of an opportunity posting database as a function of at least an attribute data table criterion. A processor is configured to match an attribute data table to an opportunity posting as a function of at least an attribute data table criterion. A processor is configured to provide a match of an attribute data table to a user.

21 Claims, 6 Drawing Sheets

(56) References Cited

U.S. PATENT DOCUMENTS

| | | | | |
|---|---|---|---|---|
| 2008/0262859 | A1* | 10/2008 | Ting | G06Q 10/06 705/1.1 |
| 2008/0288311 | A1* | 11/2008 | Nemtsev | G06Q 10/00 705/7.14 |
| 2009/0049095 | A1* | 2/2009 | Simon | G06Q 10/06 |
| 2009/0094239 | A1* | 4/2009 | Sabol | G06Q 10/10 |
| 2009/0177529 | A1* | 7/2009 | Hadi | G06Q 30/02 707/999.005 |
| 2009/0327013 | A1* | 12/2009 | McGovern | G06Q 10/1053 709/204 |
| 2010/0057535 | A1* | 3/2010 | Sheperd | G06Q 50/01 705/14.16 |
| 2011/0295759 | A1* | 12/2011 | Selvakummar | G06Q 10/1053 705/321 |
| 2012/0041889 | A1* | 2/2012 | Morrison | G06Q 10/105 705/321 |
| 2012/0101955 | A1* | 4/2012 | Mosher | G06Q 30/0207 705/321 |
| 2012/0316943 | A1* | 12/2012 | Sheperd | G06Q 30/0214 705/14.16 |
| 2013/0218794 | A1* | 8/2013 | Scott | G06Q 10/06 705/321 |
| 2013/0282606 | A1* | 10/2013 | Bhagat | G06Q 10/1053 705/321 |
| 2013/0290209 | A1* | 10/2013 | Wirz | G06Q 10/1053 705/321 |
| 2014/0052656 | A1* | 2/2014 | Ball | G06Q 10/1053 705/319 |
| 2014/0058954 | A1* | 2/2014 | Perlstein | G06Q 50/188 705/80 |
| 2014/0129552 | A1* | 5/2014 | Sinha | G06Q 50/01 707/732 |
| 2014/0156668 | A1* | 6/2014 | Dubey | G06F 16/2272 707/741 |
| 2014/0156669 | A1* | 6/2014 | Bati | G06F 16/2228 707/741 |
| 2014/0180948 | A1 | 6/2014 | McGovern et al. | |
| 2014/0201126 | A1* | 7/2014 | Zadeh | A61B 5/165 706/52 |
| 2014/0282586 | A1* | 9/2014 | Shear | G06F 9/50 718/104 |
| 2014/0317009 | A1* | 10/2014 | Bilodeau | G06Q 10/1053 705/321 |
| 2014/0358810 | A1 | 12/2014 | Hardtke et al. | |
| 2015/0006414 | A1* | 1/2015 | Janapareddy | G06Q 10/1053 705/319 |
| 2015/0006422 | A1* | 1/2015 | Carter | G06Q 10/1053 705/321 |
| 2016/0034305 | A1* | 2/2016 | Shear | G06F 16/285 707/722 |
| 2016/0034461 | A1* | 2/2016 | Sundaram | H04L 67/306 707/728 |
| 2016/0034583 | A1* | 2/2016 | Agarwal | G06F 16/9535 707/706 |
| 2017/0039523 | A1* | 2/2017 | Rotimi | G06Q 10/1053 |
| 2017/0116552 | A1* | 4/2017 | Deodhar | G06Q 10/0639 |
| 2017/0177708 | A1* | 6/2017 | Zhao | G06N 20/00 |
| 2017/0178252 | A1* | 6/2017 | Mehta | G06Q 10/1053 |
| 2017/0255906 | A1 | 9/2017 | Le et al. | |
| 2017/0337518 | A1 | 11/2017 | Fang et al. | |
| 2017/0357945 | A1 | 12/2017 | Ashkenazi et al. | |
| 2018/0204111 | A1* | 7/2018 | Zadeh | G06V 10/764 |
| 2018/0329980 | A1* | 11/2018 | Ebrahim | G06F 16/25 |
| 2019/0114593 | A1 | 4/2019 | Champaneria | |
| 2019/0139000 | A1* | 5/2019 | Sharpe | G06Q 10/1091 |
| 2019/0197487 | A1* | 6/2019 | Jersin | H04L 51/214 |
| 2019/0236106 | A1* | 8/2019 | Zhang | G06N 20/00 |
| 2020/0151647 | A1 | 5/2020 | Kathalagiri Somashekariah et al. | |
| 2020/0311685 | A1* | 10/2020 | Ahuja | G06N 20/20 |
| 2020/0327252 | A1* | 10/2020 | McFall | G06F 21/78 |
| 2020/0372304 | A1* | 11/2020 | Kenthapadi | G06N 7/01 |
| 2020/0372435 | A1* | 11/2020 | Kenthapadi | G06F 16/90335 |
| 2021/0133670 | A1* | 5/2021 | Cella | G06N 3/044 |
| 2021/0182996 | A1* | 6/2021 | Cella | G06N 3/047 |
| 2021/0312401 | A1* | 10/2021 | McHale | G06Q 10/063112 |
| 2021/0357458 | A1* | 11/2021 | Wu | G06F 16/9038 |
| 2022/0036302 | A1* | 2/2022 | Cella | G06Q 10/0834 |
| 2022/0108262 | A1* | 4/2022 | Celia | G06Q 10/063118 |
| 2022/0121884 | A1* | 4/2022 | Zadeh | G06V 10/764 |
| 2022/0172173 | A1* | 6/2022 | Danshchin | G06Q 10/063112 |
| 2022/0398241 | A1* | 12/2022 | Seth | G06F 16/2255 |

* cited by examiner

APPARATUS AND METHOD FOR ATTRIBUTE DATA TABLE MATCHING

FIELD OF THE INVENTION

The present invention generally relates to the field of attribute data table matching. In particular, the present invention is directed to an apparatus and method for attribute data table matching.

BACKGROUND

Modern apparatuses and methods for attribute data table matching to opportunity postings are limited. As such, modern apparatuses and methods for attribute data table matching may be improved.

SUMMARY OF THE DISCLOSURE

In an aspect an apparatus for attribute data table matching is presented. An apparatus includes at least a processor. An apparatus includes a memory communicatively connected to at least a processor. A memory contains instructions configured at least a processor to receive an attribute data table from a user. A processor is configured to query an opportunity posting database as a function of a received attribute data table. A processor is configured to receive a plurality of possible opportunity postings as a function of a query. A processor is configured to select an opportunity posting of an opportunity posting database as a function of at least an attribute data table criterion. A processor is configured to match an attribute data table to an opportunity posting as a function of at least an attribute data table criterion. A processor is configured to provide a match of an attribute data table to a user.

In another aspect a method of attribute data table matching is presented. A method includes receiving an attribute data table from a user at a processor communicatively connected to a memory. A method includes querying, via a processor, an opportunity posting database as a function of a received attribute data table. A method includes selecting, via a processor, an opportunity posting of an opportunity posting database as a function of at least an attribute data table criterion. A method includes matching, via a processor, an attribute data table to an opportunity posting as a function of at least an attribute data table criterion. A method includes providing, via a processor, a match of an attribute data table to a user.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to an apparatus and methods for attribute data table matching. In an embodiment, an apparatus may be configured to query an opportunity posting database for opportunity postings as a function of an attribute data table.

Aspects of the present disclosure can be used to provide a user with opportunity postings based on the user's attribute data table. Aspects of the present disclosure can also be used to generate an attribute data table through user prompts, such as through voice assistants.

Aspects of the present disclosure allow for matching opportunity postings to attribute data tables as a function of an attribute data table criterion. Exemplary embodiments illustrating aspects of the present disclosure are described below in the context of several specific examples.

Figure 1:
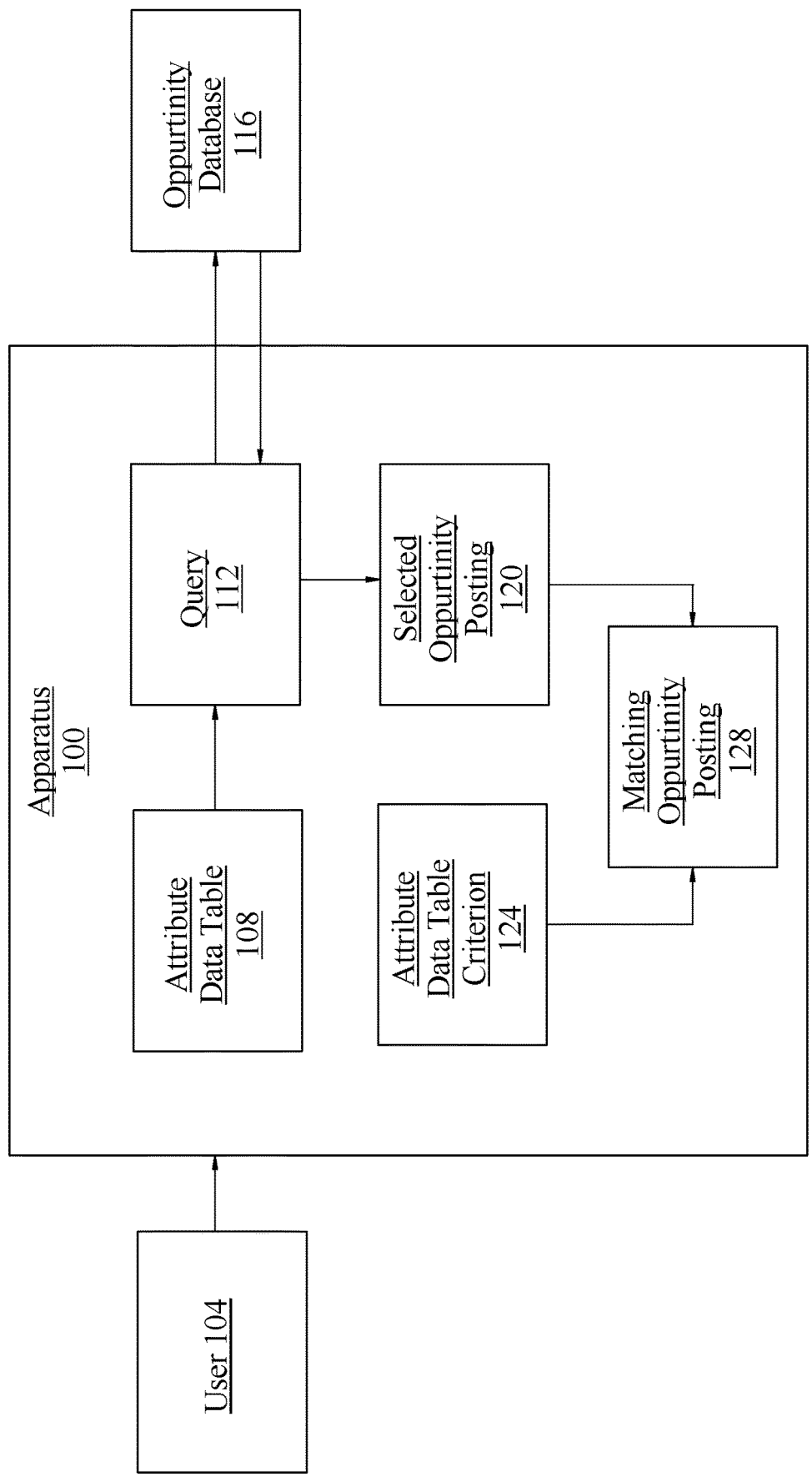
FIG. 1 is an exemplary embodiment of a block diagram of an apparatus for attribute data table matching.

Referring now to FIG. 1, an exemplary embodiment of an apparatus 100 for attribute data table matching is illustrated. Apparatus 100 may include at least a processor and a memory communicatively connected to the at least a processor. As used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Still referring to FIG. 1, a memory may contain instructions that may configured at least a processor to perform various tasks. Instructions may be received from user input, external computing devices, and the like. Apparatus 100 may include any computing device as described in this disclosure, including without limitation a microcontroller, microprocessor, digital signal processor (DSP) and/or system on a chip (SoC) as described in this disclosure. Apparatus 100 may include, be included in, and/or communicate with a mobile device such as a mobile telephone or smartphone. Apparatus 100 may include a single computing device operating independently, or may include two or more computing device operating in concert, in parallel, sequentially or the like; two or more computing devices may be included together in a single computing device or in two or more computing devices. Apparatus 100 may interface or communicate with one or more additional devices as described below in further detail via a network interface device. Network interface device may be utilized for connecting apparatus 100 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or apparatus 100. Apparatus 100 may include but is not limited to, for example, a computing device or cluster of computing devices in a first location and a second computing device or cluster of computing devices in a second location. Apparatus 100 may include one or more computing devices dedicated to data storage, security, distribution of traffic for load balancing, and the like. Apparatus 100 may distribute one or more computing tasks as described below across a plurality of computing devices of computing device, which may operate in parallel, in series, redundantly, or in any other manner used for distribution of tasks or memory between computing devices. Apparatus 100 may be implemented using a "shared nothing" architecture in which data is cached at the worker, in an embodiment, this may enable scalability of apparatus 100 and/or a computing device.

With continued reference to FIG. 1, apparatus 100 may be designed and/or configured to perform any method, method step, or sequence of method steps in any embodiment described in this disclosure, in any order and with any degree of repetition. For instance, apparatus 100 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Apparatus 100 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, apparatus 100 may be configured to receive attribute data table 108 from user 104. An "attribute data table" as used in this disclosure is a data structure containing information pertaining to characteristics of an individual. Attribute data table 108 may be received from user 104 through manual input, wireless transfer, wired transfer, and the like. Attribute data table 108 may be received from user 104 through a weblink, application portal, mobile application, and the like. Apparatus 100 may be configured to receive and/or store multiple attribute data tables 108 of user 104. In some embodiments, attribute data table 108 may include video data. "Video data" as used in this disclosure is information relating to optical and/or audio recordings. In some embodiments, video data may include, but is not limited to, video recordings of user 104. In some embodiments, attribute data table 108 may include written data. "Written data" as used in this disclosure is information conveyed through characters, symbols, markings, and the like. Written data may include words and/or phrases. In some embodiments, attribute data table 108 may include, but is not limited to, resumes, cover letters, transcripts, and the like.

Still referring to FIG. 1, apparatus 100 may be configured to acquire a plurality of video elements from video recording of user 104. Apparatus 100 may be configured to generate a video resume. As used in this disclosure, "video elements" are diverse types of features from a video resume such as image features, frame features, sound features, graphical features, and the like. As used in this disclosure, a "video resume" is a video in visual and/or audio form to provide a recording promoting a jobseeker. In some cases, a video resume may include content that is representative or communicative of at least attribute of a subject. As used in this disclosure, a "subject" is a person, for example a jobseeker. A subject may be represented directly by a video resume. For example, in some cases, an image component may include an image of a subject. As used in this disclosure, an "image component" may be a visual representation of information, such as a plurality of temporally sequential frames and/or pictures, related to video resume and target video resume. For example, an image component may include animations, still imagery, recorded video, and the like. In some cases, attributes of attribute data table 108 may be explicitly conveyed within a video resume. Alternatively, or additionally, in some cases, attributes may be conveyed implicitly with a video resume.

Still referring to FIG. 1, as used in this disclosure, a "target video resume" includes at least image component 116b that may be selected based on a request by a user or job-applicant from one or more databases in which multiple video resumes of users or job-applicants are stored. A target video resume may be the basis for apparatus 100 to search for other video resumes based on the target resume video properties. Video elements from a target video resume may relate to diverse types of features of the target video resume. As used in this disclosure, a "feature" is an individually measurable property or characteristic such as image feature, frame feature, sound feature, graphical feature, and textual feature. These features may be in the form of a floating-point number feature, a binarized feature, a fence feature, a recall feature, a pooling feature, a reranking feature, and the like.

A target video resume may be communicated by way of digital signals, for example between computing devices which are communicatively connected with at least a wireless network. Digital video may be compressed to optimize speed and/or cost of transmission of video. Videos may be compressed according to a video compression coding format (i.e., codec). Exemplary video compression codecs include H.26x codecs, MPEG formats, VVC, SVT-AV1, and the like. In some cases, compression of a digital video may be lossy, in which some information may be lost during compression. Alternatively, or additionally, in some cases, compression of a digital video may be substantially lossless, where substantially no information is lost during compression.

Still referring to FIG. 1, a video resume may be representative subject-specific data. As used in this disclosure, "subject-specific data" is any element of information that is associated with a specific subject. Exemplary forms of subject-specific data include an image component, video resume, non-verbal content, verbal content, audio component, as well as any information derived directly or indirectly from a video resume or any other subject-specific data. For example, subject-specific data could be the physical properties of a subject, such as their body posture or facial expression. Subject-specific data could also be audio sensory properties of a subject, such as a tone of voice or background audio in a video resume. In some cases, a video resume may include non-verbal content. As used in this disclosure, "non-verbal content" is all communication that is not characterized as verbal content. As used in this disclosure, "verbal content" is comprehensible language-based communication. For example, verbal content may include "visual verbal content" which is literal and/or written verbal content. Non-verbal content may include all forms of communication which are not conveyed with use of language. Exemplary non-verbal content may include change in intonation and/or stress in a speaker's voice, expression of emotion, and the like. For example, in some cases, non-verbal content may include visual non-verbal content. As used in this disclosure, "visual non-verbal content" is non-verbal content that is visually represented. In some cases, visual non-verbal content may be included within a video resume by way of an image component.

Still referring to FIG. 1, in some cases, a non-verbal classifier may classify non-verbal content present in one or more image components to one or more of target video resumes, a feature. A non-verbal classifier may include a number of classifiers, for example each being tasked with classifying a particular attribute or form of non-verbal content. For example, in some cases, non-verbal classifier may classify a video resume and a related subject as associated with a feature representative of 'personable.' Non-verbal classifier may include another specialized visual non-verbal classifier to classify visual non-verbal content as appearing 'personable' that is, for example, as having appropriate posture, facial expressions, manner of dress, and the like. In some cases, classifier may include or a constituent part of tree structure, for making associations based upon video resume. In some embodiments, an image component may include or otherwise represent verbal content. For instance, written or visual verbal content may be included within an image component. Visual verbal content may include images of written text represented by an image component. For example, visual verbal content may include, without limitation, digitally generated graphics, images of written text (e.g., typewritten, and the like), signage, and the like. In some embodiments, an image component may include or otherwise represent audible verbal content related to at least an attribute of a subject. As used in this disclosure, "audible verbal content" is oral (e.g., spoken) verbal content. In some cases, audible verbal content may be included within a video resume by way of an audio component. As used in this disclosure, an "audio component" is a representation of audio, for example a sound, a speech, and the like. In some cases, verbal content may be related to at least an attribute of subject. Additionally, or alternatively, visual verbal content and audible verbal content may be used as inputs to classifiers as described throughout this disclosure.

Still referring to FIG. 1, in some embodiments, apparatus 100 may include audiovisual speech recognition (AVSR) processes to recognize verbal content in a video resumes. For example, apparatus 100 may use image content to aid in recognition of audible verbal content such as viewing a subject move their lips to speak on video to process the audio content of a video resume. AVSR may use an image component to aid the overall translation of the audio verbal content of video resumes. In some embodiments, AVSR may include techniques employing image processing capabilities in lip reading to aid speech recognition processes. In some cases, AVSR may be used to decode (i.e., recognize) indeterministic phonemes or help in forming a preponderance among probabilistic candidates. In some cases, AVSR may include an audio-based automatic speech recognition process and an image-based automatic speech recognition process. AVSR may combine results from both processes with feature fusion. Audio-based speech recognition process may analysis audio according to any method described herein, for instance using a Mel frequency cepstrum coefficients (MFCCs) and/or log-Mel spectrogram derived from raw audio samples. Image-based speech recognition may perform feature recognition to yield an image vector. In some cases, feature recognition may include any feature recognition process described in this disclosure, for example a variant of a convolutional neural network. In some cases, AVSR employs both an audio datum and an image datum to recognize verbal content. For instance, audio vector and image vector may each be concatenated and used to predict speech made by a subject, who is 'on camera.' In some cases, apparatus 100 may be configured to recognize at least a keyword as a function of visual verbal content. In some cases, recognizing at least keyword may include optical character recognition. As used in this disclosure, a "keyword" is an element of word or syntax used to identify and/or match elements to each other. In some cases, apparatus 100 may transcribe much or even substantially all verbal content from a target resume video.

Still referring to FIG. 1, attribute data table 108 may include a plurality of attribute data of user 104. "Attribute data" as used in this disclosure is information pertaining to characteristics of an individual. Attribute data may include qualifications of user 104. Qualifications may include skills. A "skill" as used in this disclosure is the ability to perform a task. A skill may include, but is not limited to, coding skills, cooking skills, teaching skills, dentistry skills, presentation skills, driving skills, acting skills, legal skills, communication skills, reading comprehension skills, and the like. Attribute data table 108 may include data showing one or more skills of user 104. In some embodiments, qualifications may include skill levels. A "skill level" as used in this disclosure is a metric of ability an individual can perform a skill at. A skill level may include, but is not limited to, novice, beginner, advanced beginner, intermediate, competent, proficient, expert, and the like.

Still referring to FIG. 1, qualifications may include experience history. Experience history may include a quantity of time an individual has performed a skill, what entity an individual has performed a skill for, a quantity of entities an individual has performed a skill for, and the like. As a non-limiting example, experience history may show an individual has performed cooking skills for 3 years at Mario's Italian Restaurant. Qualifications may include an experience level of an individual, such as, but not limited to, entry-level, mid-level, senior, and the like. Qualifications may include academic awards, such as, but not limited to, high-school diplomas, general educational development certificates (GED), Associate of Applied Science (AAS), Associate of Arts (AA), Associate of Science (AS), Bachelor of Applied Science (BAS), Bachelor of Architecture (B.Arch.), Bachelor of Arts (Ba), Bachelor of Business Administration (BBA), Bachelor of Fine Arts (BFA), Bachelor of Science (BS), Master of Business Administration (MBA), Master of Education (M.Ed.), Master of Fine Arts (MFA), Master of Laws (LL.M.), Master of Public Administration (MPA), Master of Public Health (VIPH), Master of Publishing (M.Pub.), Master of Science (MS), Master of Social Work (MSW), Doctor of Business Administration (DBA), Doctor of Dental Surgery (DDS), Doctor of Education (Ed.D.), Doctor of Medicine (MD), Doctor of Pharmacy (Pharm.D.), Doctor of Philosophy (Ph.D.), Doctor of Psychology (Psy.D.), Juris Doctor (JD), and the like. In some embodiments, qualifications may include academic performance. Academic performance may include grades awarded, such as, but not limited to, A+, A, A−, B+, B, B−, C+, C, C−, D+, D, D−, F, and the like. In some embodiments, academic performance may include graded point averages (GPA), such as, but not limited to, a range of about 0 to 4.0. Academic performance may include academic designations, such as, but not limited to, good standing, honor roll, dean's list, valedictorian, and the like.

Still referring to FIG. 1, attribute data table 108 may include locational data of user 104. "Locational data" as used in this disclosure is information pertaining to geography. Locational data of user 104 may include, but is not limited to, residing addresses, desired locations, desired commute times, and the like. Locational data may include maximum and/or minimum distances from a residing address of user 104. For instance and without limitation, a range may include a radius of about 40 miles from a residing address of user 104. Attribute data table 108 may include identification of user 104. Identification may include, but is not limited to, names, addresses, registration numbers, and/or other forms of identification. Attribute data table 108 may include objectives of user 104, such as, but not limited to, remote work, 40 hour work week, part-time employment, full-time employment, selectable work times such as shifts, and the like. Objectives of user 104 may include objectives such as, but not limited to, becoming a senior level worker, further academic education, start a new career, and/or other objectives. As a non-limiting example, attribute data table 108 may include an objective of user 104 that may read "My objective is to become sous chef at Eddie V's Prime Seafood".

Still referring to FIG. 1, apparatus 100 may be configured to generate query 112. A "query" as used in this disclosure is a search function that returns data. Apparatus 100 may generate query 112 to search through opportunity posting database 116 for opportunity postings. In some embodiments, apparatus 100 may query opportunity posting database 116 as a function of a received attribute data table, such as attribute data table 108, through query 112. An "opportunity posting" as used in this disclosure is an opening for a skilled position. Opportunity postings may include, but are not limited to, advertisements, employer postings, unannounced positions, and the like. An "opportunity posting database" as used in this disclosure is a collection of information relating to opportunity postings. Opportunity posting database 116 may include data of opportunity postings. Query 112 may include querying criteria. "Querying criteria" as used in this disclosure are parameters that constrain a search. Querying criteria may include, but is not limited to, commute time, mutual social network connections, technical backgrounds, and the like. In some embodiments, apparatus 100 may be configured to receive a plurality of possible opportunity postings as a function of query 112. Querying criteria may be tuned by a machine learning model, such as a machine learning model described below in FIG. 6.

Still referring to FIG. 1, query 112 may include a web crawler function. Query 112 may be configured to search for one or more keywords, key phrases, and the like. A keyword may be used by query 112 to filter potential results from a query. As a non-limiting example, a keyword may include "kitchen". Query 112 may be configured to generate one or more key words and/or phrases as a function of attribute data table 108. Query 112 may give a weight to one or more attributes of attribute data table 108 when searching through opportunity posting database 116 and/or other databases. "Weights", as used herein, may be multipliers or other scalar numbers reflecting a relative importance of a particular attribute or value. A weight may include, but is not limited to, a numerical value corresponding to an importance of an element. In some embodiments, a weighted value may be referred to in terms of a whole number, such as 1, 100, and the like. As a non-limiting example, a weighted value of 0.2 may indicated that the weighted value makes up 20% of the total value. As a non-limiting example, attribute data table 108 may include an attribute of a technical background of petroleum engineering. Query 112 may give a weight of 0.8 to the words "petroleum", and a weight of 0.2 to the word "engineering". Query 112 may map a plurality of opportunity postings having similar attributes to the word "petroleum" with differing attributes than the word "engineering" due to the lower weight value paired to the word "engineering". In some embodiments, query 112 may pair one or more weighted values to one or more attributes of attribute data table 108. Weighted values may be tuned through a machine-learning model. In some embodiments, query 112 may generate weighted values based on prior queries. In some embodiments, query 112 may be configured to filter out one or more "stop words" that may not convey meaning, such as "of," "a," "an," "the," or the like.

Still referring to FIG. 1, query 112 may include a search index. A "search index" as used in this disclosure is a data structure that is configured to compare and/or match data. A search index may be used to link two or more data elements of opportunity posting database 116. A search index may enable faster lookup times by linking similar data elements, such as opportunity postings. In some embodiments, apparatus 100 and/or query 112 may generate an index classifier. In an embodiment, an index classifier may include a classifier. A "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. An index classifier may include a classifier configured to input attribute data tables and output web search indices. A "web search index," as defined in this disclosure is a data structure that stores uniform resource locators (URLs) of web pages together with one or more associated data that may be used to retrieve URLs by querying the web search index; associated data may include keywords identified in pages associated with URLs by programs such as web crawlers and/or "spiders." A web search index may include any data structure for ordered storage and retrieval of data, which may be implemented as a hardware or software module. A web search index may be implemented, without limitation, as a relational database, a key-value retrieval datastore such as a NOSQL database, or any other format or structure for use as a datastore that a person skilled in the art would recognize as suitable upon review of the entirety of this disclosure. Data entries in a web search index may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a web search index may reflect categories, cohorts, and/or populations of data consistently with this disclosure. In an embodiment, a web search query at a search engine may be submitted as a query to a web search index, which may retrieve a list of URLs responsive to the query. In some embodiments, a computing device may be configured to generate a web search query based on a freshness and/or age of a query result. A freshness may include an accuracy of a query result. An age may include a metric of how outdated a query result may be. In some embodiments, a computing device may generate a web crawler configured to search the Internet for data of areas of knowledge, such as, but not limited to, movies, sports, science, history, English, TV shows, and the like. As a non-limiting example, a computing device may generate a web crawler configured to search and/or index information on a boy band. Exterior dataset 220 may be generated as a function of data retrieved by one or more web crawlers.

Still referring to FIG. 1, apparatus 100 and/or another device may generate an index classifier using a classification algorithm, defined as a process whereby a computing device derives a classifier from training data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. Training data may include data containing correlations that a machine-learning process may use to model relationships between two or more categories of data elements. For instance, and without limitation, training data may include a plurality of data entries, each entry representing a set of data elements that were recorded, received, and/or generated together; data elements may be correlated by shared existence in a given data entry, by proximity in a given data entry, or the like. Multiple data entries in training data may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data according to various correlations; correlations may indicate causative and/or predictive links between categories of data elements, which may be modeled as relationships such as mathematical relationships by machine-learning processes as described in further detail below. Training data may be formatted and/or organized by categories of data elements, for instance by associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements; for instance, and without limitation, training data may be provided in fixed-length formats, formats linking positions of data to categories such as comma-separated value (CSV) formats and/or self-describing formats such as extensible markup language (XML), enabling processes or devices to detect categories of data.

Alternatively or additionally, and still referring to FIG. 1, training data may include one or more elements that are not categorized; that is, training data may not be formatted or contain descriptors for some elements of data. Machine-learning algorithms and/or other processes may sort training data according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data to be made applicable for two or more distinct machine-learning algorithms as described in further detail below. Training data used by a computing device may correlate any input data as described in this disclosure to any output data as described in this disclosure. In some embodiments, training data may include index training data. Index training data, defined as training data used to generate an index classifier, may include, without limitation, a plurality of data entries, each data entry including one or more elements of attribute data such as data of technical background, and one or more correlated opportunity postings, where opportunity postings and associated attribute data may be identified using feature learning algorithms as described below. Index training data and/or elements thereof may be added to, as a non-limiting example, by classification of multiple users' attribute data to opportunity postings using one or more classification algorithms.

Still referring to FIG. 1, apparatus 100 may be configured to generate an index classifier using a Naïve Bayes classification algorithm. A Naïve Bayes classification algorithm generates classifiers by assigning class labels to problem instances, represented as vectors of element values. Class labels may be drawn from a finite set. A Naïve Bayes classification algorithm may include generating a family of algorithms that assume that the value of a particular element is independent of the value of any other element, given a class variable. A Naïve Bayes classification algorithm may be based on Bayes Theorem expressed as P(A/B)=P(B/A) P(A)÷P(B), where P(AB) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A Naïve Bayes algorithm may be generated by first transforming training data into a frequency table. A computing device may then calculate a likelihood table by calculating probabilities of different data entries and classification labels. A computing device may utilize a Naïve Bayes equation to calculate a posterior probability for each class. A class containing the highest posterior probability may be the outcome of prediction. A Naïve Bayes classification algorithm may include a gaussian model that follows a normal distribution. A Naïve Bayes classification algorithm may include a multinomial model that is used for discrete counts. A Naïve Bayes classification algorithm may include a Bernoulli model that may be utilized when vectors are binary.

With continued reference to FIG. 1, apparatus 100 may be configured to generate an index classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating a k-nearest neighbors algorithm may include generating a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute/as derived using a Pythagorean noun:

$$l = \sqrt{\sum_{i=0}^{n} a_i^2},$$

where a is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values. As a non-limiting example, K-nearest neighbors algorithm may be configured to classify an input vector including a plurality of attribute data, key words and/or phrases, or the like, to clusters representing themes.

In an embodiment, and still referring to FIG. 1, apparatus 100 may generate new opportunity postings using a feature learning algorithm. A "feature learning algorithm," as used herein, is a machine-learning algorithm that identifies associations between elements of data in a training data set, where particular outputs and/or inputs are not specified. For instance, and without limitation, a feature learning algorithm may detect co-occurrences of sets of attribute data, as defined above, with each other. As a non-limiting example, a feature learning algorithm may detect co-occurrences of attribute data, as defined above, with each other. Apparatus 100 may perform a feature learning algorithm by dividing attribute data from a given source into various sub-combinations of such data to create attribute data sets as described above, and evaluate which attribute data sets tend to co-occur with which other attribute data sets. In an embodiment, a first feature learning algorithm may perform clustering of data.

Continuing to refer to FIG. 1, a feature learning and/or clustering algorithm may be implemented, as a non-limiting example, using a k-means clustering algorithm. A "k-means clustering algorithm" as used in this disclosure, includes cluster analysis that partitions n observations or unclassified cluster data entries into k clusters in which each observation or unclassified cluster data entry belongs to the cluster with the nearest mean, using, for instance behavioral training set as described above. "Cluster analysis" as used in this disclosure, includes grouping a set of observations or data entries in way that observations or data entries in the same group or cluster are more similar to each other than to those in other groups or clusters. Cluster analysis may be performed by various cluster models that include connectivity models such as hierarchical clustering, centroid models such as k-means, distribution models such as multivariate normal distribution, density models such as density-based spatial clustering of applications with nose (DBSCAN) and ordering points to identify the clustering structure (OPTICS), subspace models such as biclustering, group models, graph-based models such as a clique, signed graph models, neural models, and the like. Cluster analysis may include hard clustering whereby each observation or unclassified cluster data entry belongs to a cluster or not. Cluster analysis may include soft clustering or fuzzy clustering whereby each observation or unclassified cluster data entry belongs to each cluster to a certain degree such as for example a likelihood of belonging to a cluster; for instance, and without limitation, a fuzzy clustering algorithm may be used to identify clustering of attribute data with multiple entity skill levels, and vice versa. Cluster analysis may include strict partitioning clustering whereby each observation or unclassified cluster data entry belongs to exactly one cluster. Cluster analysis may include strict partitioning clustering with outliers whereby observations or unclassified cluster data entries may belong to no cluster and may be considered outliers. Cluster analysis may include overlapping clustering whereby observations or unclassified cluster data entries may belong to more than one cluster. Cluster analysis may include hierarchical clustering whereby observations or unclassified cluster data entries that belong to a child cluster also belong to a parent cluster.

With continued reference to FIG. 1, apparatus 100 may generate a k-means clustering algorithm receiving unclassified attribute data and outputs a definite number of classified data entry clusters wherein the data entry clusters each contain cluster data entries. K-means algorithm may select a specific number of groups or clusters to output, identified by a variable "k." Generating a k-means clustering algorithm includes assigning inputs containing unclassified data to a "k-group" or "k-cluster" based on feature similarity. Centroids of k-groups or k-clusters may be utilized to generate classified data entry cluster. K-means clustering algorithm may select and/or be provided "k" variable by calculating k-means clustering algorithm for a range of k values and comparing results. K-means clustering algorithm may compare results across different values of k as the mean distance between cluster data entries and cluster centroid. K-means clustering algorithm may calculate mean distance to a centroid as a function of k value, and the location of where the rate of decrease starts to sharply shift, this may be utilized to select a k value. Centroids of k-groups or k-cluster include a collection of feature values which are utilized to classify data entry clusters containing cluster data entries. K-means clustering algorithm may act to identify clusters of closely related attribute data, which may be provided with opportunity postings; this may, for instance, generate an initial set of opportunity postings from an initial set of attribute data of a large number of users, and may also, upon subsequent iterations, identify new clusters to be provided new opportunity posting to which additional attribute data may be classified, or to which previously used attribute data may be reclassified.

With continued reference to FIG. 1, generating a k-means clustering algorithm may include generating initial estimates for k centroids which may be randomly generated or randomly selected from unclassified data input. K centroids may be utilized to define one or more clusters. K-means clustering algorithm may assign unclassified data to one or more k-centroids based on the squared Euclidean distance by first performing a data assigned step of unclassified data. K-means clustering algorithm may assign unclassified data to its nearest centroid based on the collection of centroids ci of centroids in set C. Unclassified data may be assigned to a cluster based on $argmin_{c_i \ni C}$ dist(ci, x)$^2$, where argmin includes argument of the minimum, ci includes a collection of centroids in a set C, and dist includes standard Euclidean distance. K-means clustering module may then recompute centroids by taking mean of all cluster data entries assigned to a centroid's cluster. This may be calculated based on ci=1/|Si|Σ xi ∋ $Si^{xi}$. K-means clustering algorithm may continue to repeat these calculations until a stopping criterion has been satisfied such as when cluster data entries do not change clusters, the sum of the distances have been minimized, and/or some maximum number of iterations has been reached.

Still referring to FIG. 1, k-means clustering algorithm may be configured to calculate a degree of similarity index value. A "degree of similarity index value" as used in this disclosure, includes a distance measurement indicating a measurement between each data entry cluster generated by k-means clustering algorithm and a selected attribute data set. Degree of similarity index value may indicate how close a particular combination of attribute data and/or opportunity postings is to being classified by k-means algorithm to a particular cluster. K-means clustering algorithm may evaluate the distances of the combination of attribute data levels to the k-number of clusters output by k-means clustering algorithm. Short distances between a set of attribute data and a cluster may indicate a higher degree of similarity between the set of attribute data and a particular cluster. Longer distances between a set of attribute data and a cluster may indicate a lower degree of similarity between an attribute data set and a particular cluster.

With continued reference to FIG. 1, k-means clustering algorithm selects a classified data entry cluster as a function of the degree of similarity index value. In an embodiment, k-means clustering algorithm may select a classified data entry cluster with the smallest degree of similarity index value indicating a high degree of similarity between an attribute data set and the data entry cluster. Alternatively or additionally k-means clustering algorithm may select a plurality of clusters having low degree of similarity index values to attribute data sets, indicative of greater degrees of similarity. Degree of similarity index values may be compared to a threshold number indicating a minimal degree of relatedness suitable for inclusion of a set of attribute data in a cluster, where a degree of similarity indices falling under the threshold number may be included as indicative of high degrees of relatedness. Persons skilled in the art, upon reviewing the entirety of this disclosure, will be aware of various additional or alternative feature learning approaches that may be used consistently with this disclosure.

Still referring to FIG. 1, a computing device may be configured to generate an index classifier using thematic training data including a plurality of media items and a plurality of correlated themes. As used herein, a "media item" is an element of content transmitted over a network such as the Internet to be displayed on a user device, which may include any computing device as described in this disclosure. A media item may include, without limitation, an image, a video, an audio file, and/or a textual file. A media item may include an item of a persuasive nature, such as, without limitation, an advertisement. A media item may include a banner advertisement, a "popup" advertisement, a "pop under" advertisement, an advertisement that displays in a layer such as a layer in front of a web page, a redirect advertisement, a "splash screen" advertisement, or the like. A media item may include a "meme," a video forwarded between and/or from social media users, and/or platforms, or the like. A media item may include metadata such as owner, producer, time or place of creation, or the like A media item may include a title. A "theme" of a media item is a subject matter that the media item is promoting, describing, or otherwise providing via its content. A "principal theme" as used in this disclosure is a "main point" or primary purpose of a media item. For instance, in an advertisement, a principal theme of the advertisement may be a product, service, and/or brand being promoted or sold thereby. A principal theme of a video, story, or meme may include a main character, subject matter, place, event, or other main focus of the video, story, or meme.

Still referring to FIG. 1, media training data may be populated by receiving a plurality of user inputs, for instance via graphical user interface forms; as a non-limiting example, each such form may present to a user at least a media item and a user may select a label for each such media item from a list of labels provided to the user and/or may enter one or more words in a text entry element, which may be mapped to labels using language processing as described below; label selected by user may correspond to a user-entered identification of a principal theme of the media item. An index classifier may input media items and output principal themes of the media items.

Continuing to refer to FIG. 1, apparatus 100 may be configured to generate an index classifier using a classification algorithm, which may be implemented, without limitation, using any classification algorithm suitable for generating a vice classifier as described above. As a non-limiting example, an index classifier may use a K-nearest neighbors algorithm that may be configured to classify an input vector including a plurality of attributes of a media item, such as spoken or written text, objects depicted in images, metadata, etc., to clusters representing themes. An index classifier may alternatively or additionally be created using a naïve-Bayes classification algorithm as described above. An index classifier may enable a computing device to identify a single theme represented by the best-matching cluster and/or some number of best-matching clusters, such as the K best matching clusters; in the latter case, matching a theme as described below may include matching any of the K best themes, or the most probable theme may be treated as the main theme and the remaining matching clusters may be treated as identifying themes of secondary importance.

In an embodiment, and continuing to refer to FIG. 1, apparatus 100 may modify media training data, for instance to replace a media item with plurality of objects; plurality of objects may be used as attributes of a vector associated with a media item in media training data, for instance for use in KNN or other classification algorithms as described above. Objects of plurality of objects may include, without limitation, objects depicted in images or frames of media, objects described in textual data extracted from images or text, and/or converted from spoken words in media, or the like. In an embodiment, apparatus 100 may be configured to extract, from each media item, a plurality of content elements, such as without limitation geometric forms extracted from images and/or video frames, words or phrases of textual data, or the like. Apparatus 100 may be configured to classify each content element of the plurality of content elements to an object of a plurality of objects using an object classifier, where the object classifier may be generated using any classification algorithm as described above. An object classifier may classify words, phrases, and/or geometrical forms to clusters corresponding to labels of objects, enabling a vector representing presence or relative frequency of objects to be created, for instance by populating a vector index corresponding to each of a list of objects with a number indicating presence or absence of an object corresponding to an index and/or a number indicating a number of occurrences of an object corresponding to an index. In the latter case, as a non-limiting example, a higher number may indicate a greater prevalence of a given object in the media item, which may, as a non-limiting example, cause an index classifier to classify the media item to a theme consistent with a higher prevalence of a given object; prevalence and/or relative frequency of an object in media item may also be used, as described below, to determine a degree to which the object is presented in the media item for additional processing. In an embodiment, apparatus 100 may replace media item with a plurality of objects as described above in media training data; for instance, a separate instance of media training data in which media items are replaced with plurality of objects may be generated, permitting use thereof in place of the original media training data. Where object classifier is updated, for instance by adding to a list of objects corresponding to clusters and rerunning object classifier to classify to the updated list, media items stored in memory may be subjected to object classifier again to update each plurality of objects; each of these actions, including without limitation rerunning object classifier to classify to the updated list and/or updating plurality of objects, may be performed by a computing device. An index classifier may likewise be updated by rerunning classification algorithms on updated media training data.

Still referring to FIG. 1, an object classifier and/or classifiers may be run against one or more sets of object training data, where object training data may include any form of object training data as described above. Object training data may include, without limitation, a plurality of data entries, each data entry including one or more content elements and one or more objects represented thereby. Object training data and/or elements thereof may be entered by users, for instance via graphical user interface forms; as a non-limiting example, each such form may present to a user a geometric form, word, image, or the like, and a user may select a label for each such geometric form, word, image, or the like from a list of labels provided to the user and/or may enter one or more words in a text entry element, which may be mapped to labels using language processing as described below.

With continued reference to FIG. 1, apparatus 100 may be configured to classify geometric forms identified in images and/or video frames to objects using a visual object classifier; that is, an object classifier may include a visual object classifier. A visual object classifier may include any classifier described above; a visual object classifier may generate an output classifying a geometric form in a photograph to an object according to any classification algorithm as described above. In an embodiment, a computing device may train a visual object classifier using an image classification training set, which may, as a non-limiting example, include geometric forms extracted from photographs and identifications of one or more objects associated therewith. Image classification training set may, for instance, be populated by user entries of photographs, other images of objects, and/or geometric representations along with corresponding user entries identifying and/or labeling objects as described above.

A computing device may identify objects in the form of geometrical figures in the photographs as described above, and create training data entries in a visual object classifier training set with the photographs and correlated objects; in an embodiment, correlations may be further identified by matching locations of objects in a coordinate system mapped onto images to locations of geometric objects in a photograph, by receiving user identifications or "tags" of particular objects, or the like. A computing device may be configured to extract the plurality of content elements by extracting a plurality of geometric forms from a visual component of the media item and classify the plurality of geometric forms using the visual object classifier.

Still referring to FIG. 1, apparatus 100 may be configured to classify textual elements to objects using a linguistic object classifier; that is, an object classifier may include a linguistic object classifier. Textual elements may include words or phrases, as described in further detail below, extracted from textual data such as documents or the like. Textual elements may include other forms of data converted into textual data, such as without limitation textual data converted from audio data using speech-to-text algorithms and/or protocols, textual data extracted from images using optical character recognition (OCR), or the like. A linguistic object classifier may include any classifier described above; a linguistic object classifier may generate an output classifying an element of textual data to an object according to any classification algorithm as described above. In an embodiment, a computing device may train a linguistic object classifier using a linguistic classification training set, which may, as a non-limiting example, include elements of textual data and identifications of one or more objects associated therewith. Linguistic classification training set may, for instance, be populated by user entries of textual data along with corresponding user entries identifying and labeling objects as described above. A computing device may be configured to extract the plurality of content elements by extracting a plurality of textual elements from a verbal component of the media item and classify the plurality of textual elements using a linguistic object classifier.

Still referring to FIG. 1, generation of linguistic classification training set, mapping of user entries to object labels, and/or classification of textual objects to labels may alternatively or additionally be performed using a language processing algorithm. A language processing algorithm may operate to produce a language processing model. A language processing model may include a program automatically generated by language processing algorithm to produce associations between one or more words and/or phrases, including without limitation mathematical associations, between such words. Associations between language elements, where language elements include for purposes herein extracted words and/or object labels, without limitation, mathematical associations, including without limitation statistical correlations between any language element and any other language element and/or language elements. Statistical correlations and/or mathematical associations may include probabilistic formulas or relationships indicating, for instance, a likelihood that a given word and/or phrase indicates a given object label and/or a given additional word and/or phrase. As a further example, statistical correlations and/or mathematical associations may include probabilistic formulas or relationships indicating a positive and/or negative association between at least a word and/or phrase and an object label and/or an additional word.

Still referring to FIG. 1, a language processing algorithm may generate a language processing model by any suitable method, including without limitation a natural language processing classification algorithm; language processing model may include a natural language process classification model that enumerates and/or derives statistical relationships between input term and output terms. Algorithm to generate language processing model may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HMM). HMMs as used herein are statistical models with inference algorithms that that may be applied to the models. In such models, a hidden state to be estimated may include an association between at least a word and/or phrase and an object label and/or an additional word. There may be a finite number of labels, words and/or phrases, and/or relationships therebetween; an HMM inference algorithm, such as the forward-backward algorithm or the Viterbi algorithm, may be used to estimate the most likely discrete state given a word or sequence of words. Language processing algorithm may combine two or more approaches. For instance, and without limitation, machine-learning program may use a combination of Naïve-Bayes, Stochastic Gradient Descent (SGD), and parameter grid-searching classification techniques; the result may include a classification algorithm that returns ranked associations.

Continuing to refer to FIG. 1, generating a language processing model may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

Still referring to FIG. 1, a language processing algorithm may use a corpus of documents to generate associations between language elements in a language processing algorithm, and a computing device may then use such associations to analyze words extracted from one or more documents and determine that the one or more documents indicate a given relationship between at least a word and/or phrase and an object label and/or an additional word. In an embodiment, a computing device may perform an analysis using a selected set of significant documents, such as documents identified by one or more users and/or expert users, and/or a generalized body of documents and/or co-occurrence data, which may be compiled by one or more third parties. Documents and/or co-occurrence data may be received by a computing device by being uploaded by an expert or other persons using, without limitation, file transfer protocol (FTP) or other suitable methods for transmission and/or upload of documents; alternatively or additionally, where a document is identified by a citation, a uniform resource identifier (URI), uniform resource locator (URL) or other datum permitting unambiguous identification of the document, a computing device may automatically obtain the documents, co-occurrence data, or the like by downloading and/or navigating to one or more centralized and/or distributed collections thereof. A computing device may alternatively or additionally receive any language processing model from one or more remote devices or third-party devices and utilize such language processing model as described above.

Still referring to FIG. 1, apparatus 100 may detect and/or intercept media using one or more programs and/or modules that can act to detect and/or redirect content that is being transmitted to a user device; such programs and/or modules may include, without limitation, web browsers provided to a user device, "plugins" or the like operating on web browsers on a user device, programs and/or modules installed at advertisement providers, content providers, social media platforms or the like, and/or programs that route network traffic through one or more servers operated by a computing device as a portal for network access for human subject's device. Persons skilled in the art, upon reviewing the entirety of this disclosure, will be aware of various additional or alternative ways in which a computing device may receive and/or detect media items within the scope of this disclosure.

With continued reference to FIG. 1, apparatus 100 may be configured to identify a principal theme of a received media item using a media theme classifier. Apparatus 100 may input a media item to a media theme classifier, which may output a principal theme, for instance by identifying a cluster, corresponding to a theme, which is most closely associated with a media item, as described above. In an embodiment, apparatus 100 may input a plurality of objects identified in the media item to a media theme classifier. For instance, and without limitation, a computing device may extract a plurality of content elements from a media item, where extraction may be performed in any manner described above. Apparatus 100 may classify each content element of plurality of content elements to an object of a plurality of objects using an object classifier, which may be any object classifier or collection of object classifiers as described above. Apparatus 100 may input plurality of objects to a media theme classifier.

Still referring to FIG. 1, query 112 may be generated by apparatus 100 using a fuzzy logic comparison. A fuzzy logic comparison may include a first fuzzy set. A first fuzzy set may be represented, without limitation, according to a first membership function representing a probability that an input falling on a first range of values is a member of the first fuzzy set, where the first membership function has values on a range of probabilities such as without limitation the interval [0,1], and an area beneath the first membership function may represent a set of values within first fuzzy set. Although a first range of values is illustrated for clarity in this exemplary depiction as a range on a single number line or axis, a first range of values may be defined on two or more dimensions, representing, for instance, a Cartesian product between a plurality of ranges, curves, axes, spaces, dimensions, or the like. A first membership function may include any suitable function mapping a first range to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, & \text{for } x > c \text{ and } x < a \\ \frac{x-a}{b-a}, & \text{for } a \leq x < b \\ \frac{c-x}{c-b}, & \text{if } b < x \leq c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{\frac{1}{2}\left(\frac{x-c}{\sigma}\right)^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

Still referring to FIG. 1, a first fuzzy set may represent any value or combination of values as described above, including attribute data, probabilistic outcome, any resource datum, any niche datum, and/or any combination of the above. A second fuzzy set, which may represent any value which may be represented by first fuzzy set, may be defined by a second membership function on a second range; a second range may be identical and/or overlap with a first range and/or may be combined with first range via Cartesian product or the like to generate a mapping permitting evaluation overlap of a first fuzzy set and a second fuzzy set. Where first fuzzy set and second fuzzy set have a region that overlaps, a first membership function and a second membership function may intersect at a point representing a probability, as defined on probability interval, of a match between a first fuzzy set and a second fuzzy set. Alternatively or additionally, a single value of a first and/or a second fuzzy set may be located at a locus on a first range and/or a second range, where a probability of membership may be taken by evaluation of a first membership function and/or a second membership function at that range point. A probability may be compared to a threshold to determine whether a positive match is indicated. A threshold may, in a non-limiting example, represent a degree of match between a first fuzzy set and a second fuzzy set, and/or single values therein with each other or with either set, which is sufficient for purposes of the matching process; for instance, threshold may indicate a sufficient degree of overlap between probabilistic outcomes and/or predictive prevalence values for combination to occur as described above. There may be multiple thresholds; for instance, a second threshold may indicate a sufficient match for purposes of a pooling threshold as described in this disclosure. Each threshold may be established by one or more user inputs. Alternatively or additionally, each threshold may be tuned by a machine-learning and/or statistical process, for instance and without limitation as described in further detail below.

Still referring to FIG. 1, in an embodiment, a degree of match between fuzzy sets may be used to rank one attribute datum against another. For instance, if two attribute datums have fuzzy sets matching a probabilistic outcome fuzzy set by having a degree of overlap exceeding a threshold, apparatus 100 may further rank the two attribute datums by ranking an attribute datum having a higher degree of match more highly than an attribute datum having a lower degree of match. Where multiple fuzzy matches are performed, degrees of match for each respective fuzzy set may be computed and aggregated through, for instance, addition, averaging, or the like, to determine an overall degree of match, which may be used to rank attribute data; selection between two or more matching attribute datums may be performed by selection of a highest-ranking attribute datum, and/or multiple predictive prevalence values may be presented to a user in order of ranking. Apparatus 100 may use fuzzy logic to classify and/or group two or more data entries. In a non-limiting example, apparatus 100 may determine, using fuzzy logic, inputs from query 112 as "no experience required" and "unpaid" and output "internship". As another non-limiting example, apparatus 100 may determine inputs as "8 years' experience required" and "Microbiology Ph.D required" and output "Senior Biology Opportunity".

Still referring to FIG. 1, query 112 may search opportunity posting database 116 and return selected opportunity posting 120. In some embodiments, apparatus 100 may be configured to select selected opportunity posting 120 of an opportunity posting database 116 as a function of at least an attribute data table criterion, such as attribute data table criterion 124. A "selected opportunity posting" as used in this disclosure is a chosen listing for a career opening from an entity. Query 112 may provide two or more selected opportunity postings 120. Selected opportunity posting 120 may be chosen from opportunity posting database 116 through query 112 as described above. In some embodiments, apparatus 100 may compare selected opportunity posting 120 to attribute data table criterion 124. An "attribute data table criterion" as used in this disclosure is a parameter that constraints a function. Attribute data table criterion 124 may include, but is not limited to, attributes such as locations, salary ranges, experience levels, years of experience, tuition assistance, and the like. In some embodiments, apparatus 100 may include two or more attribute data table criterion 124. Attribute data table criterion 124 may be given a weighted value by apparatus 100 Attribute data table criterion 124 may be tuned by a machine learning model, such as any machine learning model described throughout this disclosure. In some embodiments, attribute data table criterion 124 may be received from user input. As a non-limiting example, a user may want to constrain query 112 to return opportunity postings within 15 miles from Boston, Mass. In some embodiments, apparatus 100 may preemptively provide user 104 with recommended attribute data table criterion 124.

Still referring to FIG. 1, apparatus 100 may include an objective function. An "objective function" as used in this disclosure is a process of minimizing or maximizing one or more values based on a set of constraints. Apparatus 100 may generate an objective function to optimize a matching of two or more opportunity postings. In some embodiments, an objective function of apparatus 100 may include an optimization criterion. An optimization criterion may include any description of a desired value or range of values for one or more attributes of an opportunity posting; desired value or range of values may include a maximal or minimal value, a range between maximal or minimal values, or an instruction to maximize or minimize an attribute. As a non-limiting example, an optimization criterion may specify that an attribute of an opportunity posting should be within a 1% difference of an attribute data table criterion; an optimization criterion may cap a distance of an opportunity posting, for instance specifying that an opportunity posting must not have a distance from a residing address greater than a specified value. An optimization criterion may alternatively request that an attribute of an opportunity posting be greater than a certain value. An optimization criterion may specify one or more tolerances for precision in opportunity posting matching. An optimization criterion may specify one or more desired attribute data table criteria for a matching process. In an embodiment, an optimization criterion may assign weights to different attributes or values associated with attributes. One or more weights may be expressions of value to a user of a particular outcome, attribute value, or other facet of a matching process; value may be expressed, as a non-limiting example, in remunerative form, such as a salary, a quickest available start date, or the like. As a non-limiting example, minimization of commute range may be multiplied by a first weight, while tolerance above a certain value may be multiplied by a second weight. Optimization criteria may be combined in weighted or unweighted combinations into a function reflecting an overall outcome desired by a user; function may be an attribute function to be minimized and/or maximized. Function may be defined by reference to attribute data table criteria constraints and/or weighted aggregation thereof as provided by apparatus 100; for instance, an attribute function combining optimization criteria may seek to minimize or maximize a function of opportunity posting matching.

Still referring to FIG. 1, apparatus 100 may use an objective function to compare selected opportunity posting 120 with attribute data table criterion 124. Generation of an objective function may include generation of a function to score and weight factors to achieve a process score for each feasible pairing. In some embodiments, pairings may be scored in a matrix for optimization, where columns represent opportunity postings and rows represent matches potentially paired therewith; each cell of such a matrix may represent a score of a pairing of the corresponding opportunity posting to the corresponding match. In some embodiments, assigning a predicted process that optimizes the objective function includes performing a greedy algorithm process. A "greedy algorithm" is defined as an algorithm that selects locally optimal choices, which may or may not generate a globally optimal solution. For instance, apparatus 100 may select pairings so that scores associated therewith are the best score for each opportunity posting and/or for each attribute data table criterion. In such an example, optimization may determine the combination of opportunity postings such that each opportunity posting pairing includes the highest score possible.

Still referring to FIG. 1, an objective function may be formulated as a linear objective function. Computing device 104 may solve an objective function using a linear program such as without limitation a mixed-integer program. A "linear program," as used in this disclosure, is a program that optimizes a linear objective function, given at least a constraint. For instance, and without limitation, objective function may seek to maximize a total score $\Sigma_{r \in R} \Sigma_{s \in S} c_{rs} x_{rs}$, where R is a set of all opportunity postings r, S is a set of all matches s, $c_{rs}$ is a score of a pairing of a given opportunity posting with a given match, and x, is 1 if an opportunity posting r is paired with a match s, and 0 otherwise. Continuing the example, constraints may specify that each opportunity posting is assigned to only one match, and each match is assigned only one opportunity posting. Matches may include matching processes as described above. Sets of opportunity postings may be optimized for a maximum score combination of all generated opportunity postings. In various embodiments, apparatus 100 may determine a combination of opportunity postings that maximizes a total score subject to a constraint that all opportunity postings are paired to exactly one match. Not all matches may receive an opportunity pairing since each match may only produce one opportunity pairing. In some embodiments, an objective function may be formulated as a mixed integer optimization function. A "mixed integer optimization" as used in this disclosure is a program in which some or all of the variables are restricted to be integers. A mathematical solver may be implemented to solve for the set of feasible pairings that maximizes the sum of scores across all pairings; mathematical solver may be implemented on apparatus 100, another device, and/or may be implemented on third-party solver.

With continued reference to FIG. 1, optimizing an objective function may include minimizing a loss function, where a "loss function" is an expression an output of which an optimization algorithm minimizes to generate an optimal result. As a non-limiting example, apparatus 100 may assign variables relating to a set of parameters, which may correspond to score opportunity postings as described above, calculate an output of mathematical expression using the variables, and select a pairing that produces an output having the lowest size, according to a given definition of "size," of the set of outputs representing each of plurality of candidate opportunity posting combinations; size may, for instance, included absolute value, numerical size, or the like. Selection of different loss functions may result in identification of different potential pairings as generating minimal outputs. Objectives represented in an objective function and/or loss function may include minimization of distance. Objectives may include minimization of experience required. Objectives may include minimization of attribute data table criteria differences. Objectives may include minimization of salary range differences. Objectives may include minimization of academic requirements.

Still referring to FIG. 1, apparatus 100 may determine matching opportunity posting 128 as a function of at least an attribute data table criterion, such as attribute data table criterion 124. A "matching opportunity posting" as used in this disclosure is a listing for a career opening that matches with one or more attributes. Matching opportunity posting 128 may include an opportunity posting meeting attribute data table criterion 124. In some embodiments, apparatus 100 may present one or more matching opportunity postings 128 to user 104 through a graphical user interface (GUI). Apparatus 100 may present matching opportunity postings 128 in a hierarchal list. A hierarchical list may be presented based on a closest match, for instance and without limitation, a top of a hierarchical list showing opportunity postings matching the most attribute data table criterion 124 and the bottom of the list showing opportunity postings that meet a few attribute data table criterion 124. In some embodiments, apparatus 100 may receive input from user 104, such as preferred attribute order. An "attribute order" as used in this disclosure is a listing of elements by characteristics. As a non-limiting example, user 104 may want to list opportunity postings by salary range, commute times, experience level, tuition assistance, shift schedules, and the like. Apparatus 100 may present opportunity postings to user 104 in order of an attribute rank. In some embodiments, apparatus 100 may recommend an attribute rank to user 104. Apparatus 100 may use a recommendation machine learning model to provide a recommendation to user 104. A recommendation machine learning may be trained with training data correlating opportunity postings and attribute data as inputs and selected opportunity postings as outputs. Training data may be received from user input, external computing devices, and/or previous iterations of processing. A recommendation machine learning model may input attribute data and opportunity postings and output recommended opportunity postings. Apparatus 100 may provide matching opportunity posting 128 to user 104 through, but not limited to, a mobile application, web portal, smartphone, tablet, desktop, laptop, and the like. Apparatus 100 may generate push notifications for user 104 which may notify user 104 of determine matching opportunity postings 128. In some embodiments, apparatus 100 may continually generate query 112 as a background process. User 104 may select a time period for query 112, such as, but not limited to, minutes, hours, days, weeks, months, years, and the like. Apparatus 100 may update selected opportunity posting 120 and/or matching opportunity posting 128 until user intervention, such as a selection of an opportunity posting. In some embodiments, apparatus 100 may provide matching opportunity posting 128 and user 104 may provide feedback, such as acceptance and/or rejection of matching opportunity posting 128. Apparatus 100 may tighten constraints of query 112 as a function of a rejection of user 104. In some embodiments, apparatus 100 may provide one or more attribute data table criterion 124 for user 104 to narrow query 112 to. As a non-limiting example, user 104 may reject matching opportunity posting 128 because it is a full-time employment type. User 104 may select a constraint, such as attribute data table criterion 124, to narrow results of query 112. Continuing this example, apparatus 100 may not need to generate query 112 all over from a beginning, but rather may modify query 112 as a function of input from user 104.

Figure 2:
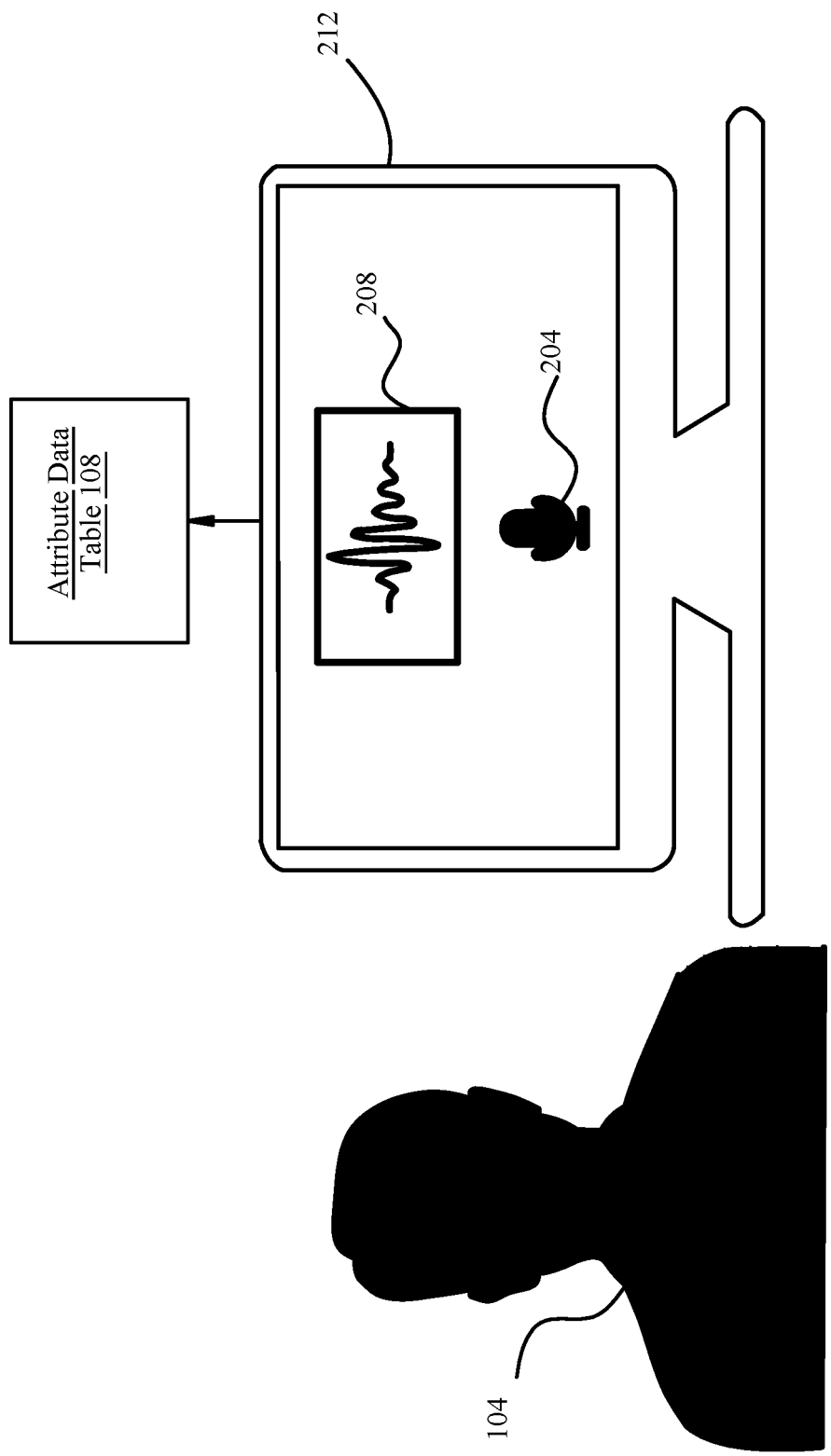
FIG. 2 is an exemplary embodiment of an attribute data table generation from a user prompt.

Referring now to FIG. 2, an exemplary embodiment of an attribute data table generation from a user prompt is shown. Apparatus 100 may be configured to interact with user 104 through display 212. Display 212 may include, but is not limited to, liquid crystal displays (LCD), organic light emitting diode (OLED) displays, and the like. Display 212 me include a screen of, but not limited to, a smartphone, laptop, tablet, monitor, and the like. Apparatus 100 may generate prompt 204. A "prompt" as used in this disclosure is a triggering event requiring action. Prompt 204 may include, but is not limited to, audio prompts, video prompts, and the like. Apparatus 100 may be configured to prompt user 104 with attribute inquiries pertaining to opportunities. In some embodiments, apparatus 100 may be configured to generate attribute data table 108 as a function of a response of user 104. In some embodiments, apparatus 100 may generate prompt 204 through a voice assistant. A voice assistant may include, but is not limited to, Siri, Google Assistant, Alexa, Cortana, Bixby, and the like. Apparatus 100 may interact with user 104 through a voice assistant configured to generate prompt 204. Prompt 204 may include questions pertaining to attribute data of user 104. As a non-limiting example, prompt 204 may include a voice assistant generated question asking, "How long have you worked as a veterinarian?". User 104 may respond to prompt 204 through vocal, visual, and/or manual input. Apparatus 100 may be configured to record attribute data of user 104 through devices such as, but not limited to, microphones, cameras, keyboards, and the like.

Still referring to FIG. 2, apparatus 100 may include a microphone. As used in this disclosure, a "microphone" is any transducer configured to transduce pressure change phenomenon to a signal, for instance a signal representative of a parameter associated with the phenomenon. Microphone, according to some embodiments, may include a transducer configured to convert sound into electrical signal. Exemplary non-limiting microphones include dynamic microphones (which may include a coil of wire suspended in a magnetic field), condenser microphones (which may include a vibrating diaphragm condensing plate), and a contact (or conductance) microphone (which may include piezoelectric crystal material). A microphone may include any microphone for transducing pressure changes, as described above; therefore, a microphone may include any variety of microphone, including any of: condenser microphones, electret microphones, dynamic microphones, ribbon microphones, carbon microphones, piezoelectric microphones, fiber-optic microphones, laser microphones, liquid microphones, microelectromechanical systems (MEMS) microphones, and/or a speaker microphone.

Still referring to FIG. 2, a microphone may be configured to generate an audio signal. An "audio signal," as used in this disclosure, is a representation of sound. In some cases, an audio signal may include an analog electrical signal of time-varying electrical potential. In some embodiments, an audio signal may be communicated (e.g., transmitted and/or received) by way of an electrically transmissive path (e.g., conductive wire), for instance an audio signal path. Alternatively or additionally, audio signal may include a digital signal of time-varying digital numbers. In some cases, a digital audio signal may be communicated (e.g., transmitted and/or received) by way of any of an optical fiber, at least an electrically transmissive path, and the like. In some cases, a line code and/or a communication protocol may be used to aid in communication of a digital audio signal. Exemplary digital audio transports include, without limitation, Alesis Digital Audio Tape (ADAT), Tascam Digital Interface (TDIF), Toshiba Link (TOSLINK), Sony/Philips Digital Interface (S/PDIF), Audio Engineering Society standard 3 (AES3), Multichannel Audio Digital Interface (MADI), Musical Instrument Digital Interface (MIDI), audio over Ethernet, and audio over IP. Audio signals may represent frequencies within an audible range corresponding to ordinary limits of human hearing, for example substantially between about 20 and about 20,000 Hz. According to some embodiments, an audio signal may include one or more parameters, such as without limitation bandwidth, nominal level, power level (e.g., in decibels), and potential level (e.g., in volts). In some cases, relationship between power and potential for an audio signal may be related to an impedance of a signal path of the audio signal. In some cases, a signal path may single-ended or balanced.

Still referring to FIG. 2, in some embodiments, apparatus 100 may be configured to recognize speech automatically. Automatic speech recognition may require training (i.e., enrollment). In some cases, training an automatic speech recognition model may require an individual speaker to read text or isolated vocabulary. In some cases, a solicitation video may include an audio component having an audible verbal content, the contents of which are known a priori by computing device 104. Computing device 104 may then train an automatic speech recognition model according to training data which includes audible verbal content correlated to known content. In this way, computing device 104 may analyze a person's specific voice and train an automatic speech recognition model to the person's speech, resulting in increased accuracy. Alternatively or additionally, in some cases, computing device 104 may include an automatic speech recognition model that is speaker-independent. As used in this disclosure, a "speaker independent" automatic speech recognition process does not require training for each individual speaker. Conversely, as used in this disclosure, automatic speech recognition processes that employ individual speaker specific training are "speaker dependent."

Still referring to FIG. 2, in some embodiments, an automatic speech recognition process may perform voice recognition or speaker identification. As used in this disclosure, "voice recognition" refers to identifying a speaker, from audio content, rather than what the speaker is saying. In some cases, computing device 104 may first recognize a speaker of verbal audio content and then automatically recognize speech of the speaker, for example by way of a speaker dependent automatic speech recognition model or process. In some embodiments, an automatic speech recognition process can be used to authenticate or verify an identity of a speaker. In some cases, a speaker may or may not include subject. For example, subject may speak within solicitation video, but others may speak as well.

Still referring to FIG. 2, in some embodiments, an automatic speech recognition process may include one or all of acoustic modeling, language modeling, and statistically-based speech recognition algorithms. In some cases, an automatic speech recognition process may employ hidden Markov models (HMMs). As discussed in greater detail below, language modeling such as that employed in natural language processing applications like document classification or statistical machine translation, may also be employed by an automatic speech recognition process.

Still referring to FIG. 2, an exemplary algorithm employed in automatic speech recognition may include or even be based upon hidden Markov models. Hidden Markov models (HMIs) may include statistical models that output a sequence of symbols or quantities. HMIs can be used in speech recognition because a speech signal can be viewed as a piecewise stationary signal or a short-time stationary signal. For example, over a short time scale (e.g., 10 milliseconds), speech can be approximated as a stationary process. Speech (i.e., audible verbal content) can be understood as a Markov model for many stochastic purposes.

Still referring to FIG. 2, in some embodiments HMMs can be trained automatically and may be relatively simple and computationally feasible to use. In an exemplary automatic speech recognition process, a hidden Markov model may output a sequence of n-dimensional real-valued vectors (with n being a small integer, such as 10), at a rate of about one vector every 10 milliseconds. Vectors may consist of cepstral coefficients. A cepstral coefficient requires using a spectral domain. Cepstral coefficients may be obtained by taking a Fourier transform of a short time window of speech yielding a spectrum, decorrelating the spectrum using a cosine transform, and taking first (i.e., most significant) coefficients. In some cases, an HMM may have in each state a statistical distribution that is a mixture of diagonal covariance Gaussians, yielding a likelihood for each observed vector. In some cases, each word, or phoneme, may have a different output distribution; an HMM for a sequence of words or phonemes may be made by concatenating an HMMs for separate words and phonemes.

Still referring to FIG. 2, in some embodiments, an automatic speech recognition process may use various combinations of a number of techniques in order to improve results. In some cases, a large-vocabulary automatic speech recognition process may include context dependency for phonemes. For example, in some cases, phonemes with different left and right context may have different realizations as HMM states. In some cases, an automatic speech recognition process may use cepstral normalization to normalize for different speakers and recording conditions. In some cases, an automatic speech recognition process may use vocal tract length normalization (VTLN) for male-female normalization and maximum likelihood linear regression (MLLR) for more general speaker adaptation. In some cases, an automatic speech recognition process may determine so-called delta and delta-delta coefficients to capture speech dynamics and might use heteroscedastic linear discriminant analysis (HLDA). In some cases, an automatic speech recognition process may use splicing and an linear discriminate analysis (LDA)-based projection, which may include heteroscedastic linear discriminant analysis or a global semi-tied covariance transform (also known as maximum likelihood linear transform [MLLT]). In some cases, an automatic speech recognition process may use discriminative training techniques, which may dispense with a purely statistical approach to HMM parameter estimation and instead optimize some classification-related measure of training data; examples may include maximum mutual information (MMI), minimum classification error (MCE), and minimum phone error (MPE).

Still referring to FIG. 2, in some embodiments, an automatic speech recognition process may be said to decode speech (i.e., audible verbal content). Decoding of speech may occur when an automatic speech recognition system is presented with a new utterance and must compute a most likely sentence. In some cases, speech decoding may include a Viterbi algorithm. A Viterbi algorithm may include a dynamic programming algorithm for obtaining a maximum a posteriori probability estimate of a most likely sequence of hidden states (i.e., Viterbi path) that results in a sequence of observed events. Viterbi algorithms may be employed in context of Markov information sources and hidden Markov models. A Viterbi algorithm may be used to find a best path, for example using a dynamically created combination hidden Markov model, having both acoustic and language model information, using a statically created combination hidden Markov model (e.g., finite state transducer [FST] approach).

Still referring to FIG. 2, in some embodiments, speech (i.e., audible verbal content) decoding may include considering a set of good candidates and not only a best candidate, when presented with a new utterance. In some cases, a better scoring function (i.e., re-scoring) may be used to rate each of a set of good candidates, allowing selection of a best candidate according to this refined score. In some cases, a set of candidates can be kept either as a list (i.e., N-best list approach) or as a subset of models (i.e., a lattice). In some cases, re-scoring may be performed by optimizing Bayes risk (or an approximation thereof). In some cases, re-scoring may include optimizing for sentence (including keywords) that minimizes an expectancy of a given loss function with regards to all possible transcriptions. For example, re-scoring may allow selection of a sentence that minimizes an average distance to other possible sentences weighted by their estimated probability. In some cases, an employed loss function may include Levenshtein distance, although different distance calculations may be performed, for instance for specific tasks. In some cases, a set of candidates may be pruned to maintain tractability.

Still referring to FIG. 2, in some embodiments, an automatic speech recognition process may employ dynamic time warping (DTW)-based approaches. Dynamic time warping may include algorithms for measuring similarity between two sequences, which may vary in time or speed. For instance, similarities in walking patterns would be detected, even if in one video the person was walking slowly and if in another he or she were walking more quickly, or even if there were accelerations and deceleration during the course of one observation. DTW has been applied to video, audio, and graphics—indeed, any data that can be turned into a linear representation can be analyzed with DTW. In some cases, DTW may be used by an automatic speech recognition process to cope with different speaking (i.e., audible verbal content) speeds. In some cases, DTW may allow computing device 104 to find an optimal match between two given sequences (e.g., time series) with certain restrictions. That is, in some cases, sequences can be "warped" non-linearly to match each other. In some cases, a DTW-based sequence alignment method may be used in context of hidden Markov models.

Still referring to FIG. 2, in some embodiments, an automatic speech recognition process may include a neural network. Neural network may include any neural network, for example those disclosed with reference to FIGS. 1-4. In some cases, neural networks may be used for automatic speech recognition, including phoneme classification, phoneme classification through multi-objective evolutionary algorithms, isolated word recognition, audiovisual speech recognition, audiovisual speaker recognition and speaker adaptation. In some cases, neural networks employed in automatic speech recognition may make fewer explicit assumptions about feature statistical properties than HMMs and therefore may have several qualities making them attractive recognition models for speech recognition. When used to estimate the probabilities of a speech feature segment, neural networks may allow discriminative training in a natural and efficient manner. In some cases, neural networks may be used to effectively classify audible verbal content over short-time interval, for instance such as individual phonemes and isolated words. In some embodiments, a neural network may be employed by automatic speech recognition processes for pre-processing, feature transformation and/or dimensionality reduction, for example prior to HMM-based recognition. In some embodiments, long short-term memory (LSTM) and related recurrent neural networks (RNNs) and Time Delay Neural Networks(TDNN's) may be used for automatic speech recognition, for example over longer time intervals for continuous speech recognition.

Still referring to FIG. 2, apparatus 100 may use an automatic speech recognition process to determine attribute data from user 104, such as from vocal response 208. Vocal response 208 may include sounds emitted from user 104. In some embodiments, vocal response 208 may include, but is not limited to, words, phrases, and the like. Apparatus 100 may generate a second prompt 204 as a function of vocal response 208. As a non-limiting example, prompt 2004 may include a question of "What is your technical background?" to which user 104 may respond with "Plastic engineering", to which apparatus 100 may generate a second prompt asking, "How long have you practiced plastic engineering?". Apparatus 100 may use a prompt machine learning model to determine prompt 204. A prompt machine learning model may be trained with training data correlating attribute data to prompts. Training data may be received from user input, external computing devices, and/or previous iterations of processing. A prompt machine learning model may input attribute data and output prompts. In some embodiments, user 104 may select a few basic attribute inquiries, such as, but not limited to, technical background, desired location, years of experience, and the like. Apparatus 100 may generate prompt 204 as a function of pre-answered prompts. In other embodiments, apparatus 100 may generate prompts without any initial information. Apparatus 100 may use vocal response 208 to generate attribute data table 120. Attribute data table 120 may include attribute data such as, but not limited to, skill level, years of experience, technical background, residing address, and the like. Attribute data may be as described above in FIG. 1.

Figure 3:
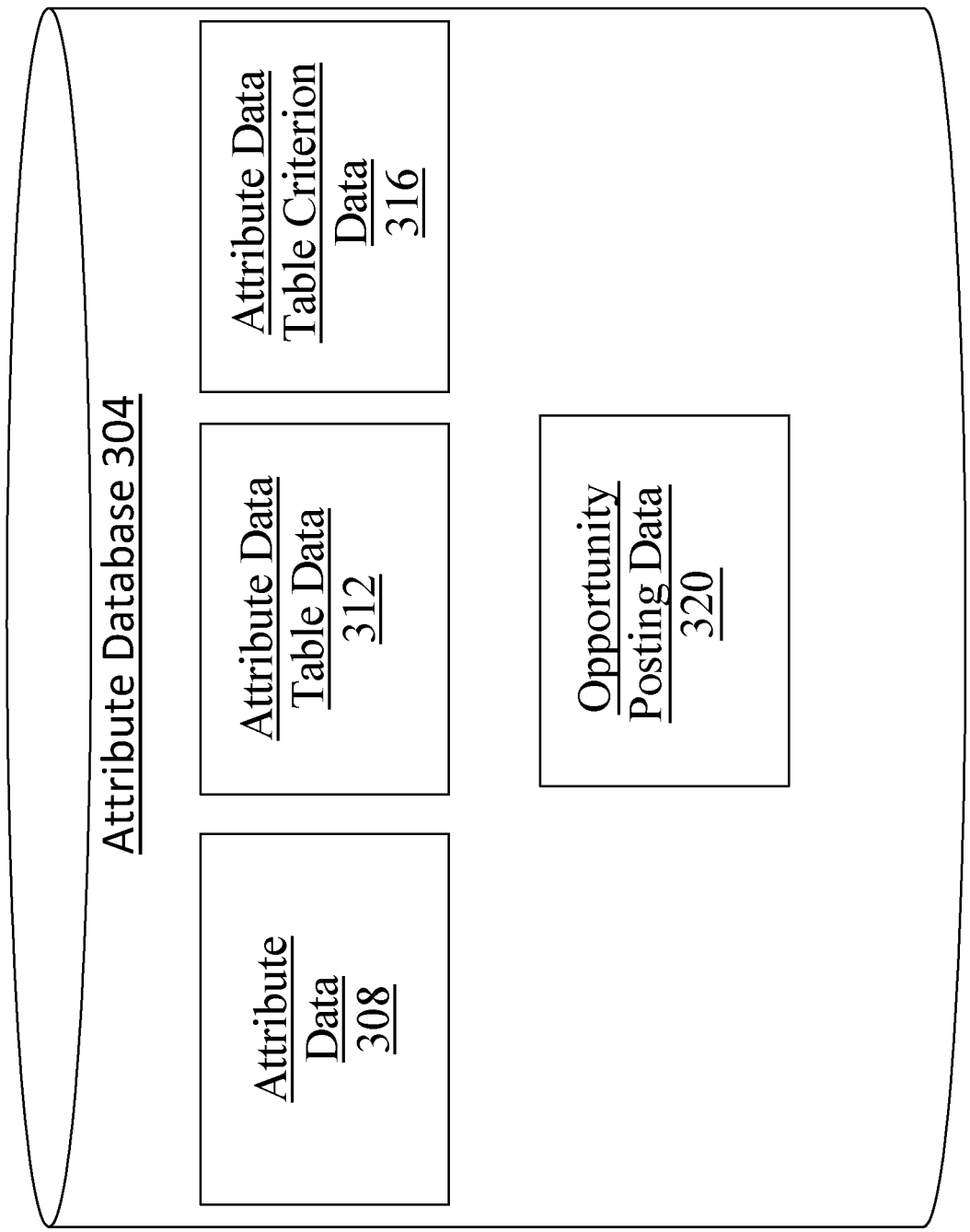
FIG. 3 is an exemplary embodiment of an attribute database.

Referring now to FIG. 3, attribute database 304 is shown. Attribute database 304 may include attribute data 308 of a plurality of attributes. Attributes may include, but are not limited to, technical background, skill level, skill category, years of experience, residing address, employment type, salary ranges, and the like. Attribute data 308 may include data of one or more users.

Still referring to FIG. 3, attribute database 304 may include attribute data table data 312. Attribute data table data 312 may include one or more attribute data tables. In some embodiments, attribute data table data 312 may include, but is not limited to, attributes, formats, categories, and the like. Attribute data table data 312 may include categories of attribute data tables, such as, but not limited to, full-time, part-time, internship, and the like. Categories may further include technical backgrounds, objectives, and the like. As a non-limiting example, attribute data table data 312 may include an attribute data table for a part-time employment as a biology research assistant, and an attribute data table for a full-time kindergarten teacher.

Still referring to FIG. 3, attribute database 304 may include attribute data table criterion data 316. Attribute data table criterion data 316 may include criterion pertaining to queries for opportunity postings. Attribute data table criterion data 316 may include, but is not limited to, commute distances, salary ranges, employment type, experience required, tuition assistance, and the like.

Still referring to FIG. 3, attribute database 304 may include opportunity posting data 320. Opportunity posting data 320 may include data of one or more opportunity postings. In some embodiments, opportunity posting data 320 may include, but is not limited to, data of opportunity posting categories, previously matched opportunity postings, similar opportunity postings, and the like.

Figure 4:
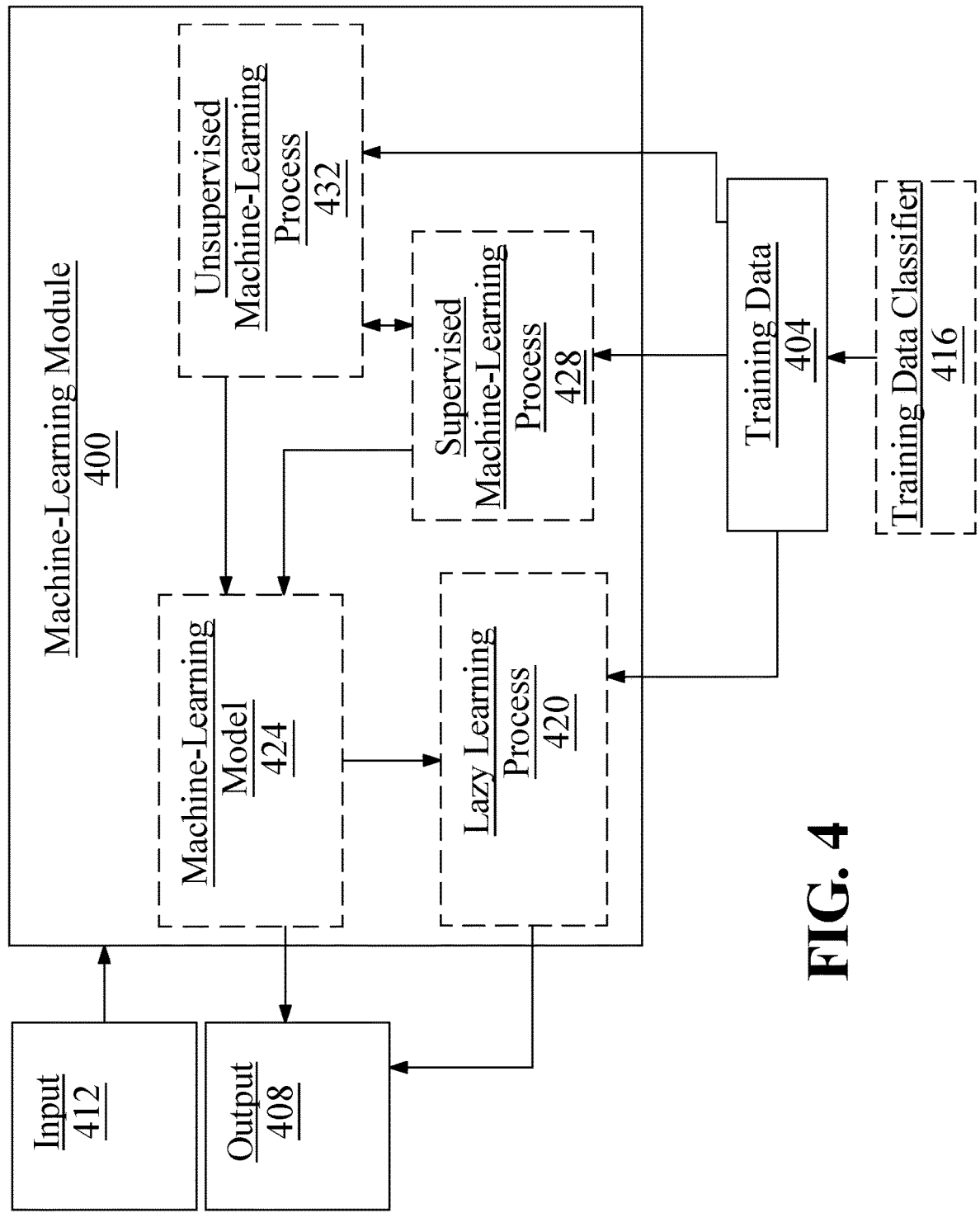
FIG. 4 a block diagram of a machine learning model.

Referring now to FIG. 4, an exemplary embodiment of a machine-learning module 400 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 404 to generate an algorithm that will be performed by a computing device/module to produce outputs 408 given data provided as inputs 412; this is in contrast to a non-machine learning software program where the commands to be executed are determined in advance by a user and written in a programming language.

Still referring to FIG. 4, "training data," as used herein, is data containing correlations that a machine-learning process may use to model relationships between two or more categories of data elements. For instance, and without limitation, training data 404 may include a plurality of data entries, each entry representing a set of data elements that were recorded, received, and/or generated together; data elements may be correlated by shared existence in a given data entry, by proximity in a given data entry, or the like. Multiple data entries in training data 404 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 404 according to various correlations; correlations may indicate causative and/or predictive links between categories of data elements, which may be modeled as relationships such as mathematical relationships by machine-learning processes as described in further detail below. Training data 404 may be formatted and/or organized by categories of data elements, for instance by associating data elements with one or more descriptors corresponding to categories of data elements. As a non-limiting example, training data 404 may include data entered in standardized forms by persons or processes, such that entry of a given data element in a given field in a form may be mapped to one or more descriptors of categories. Elements in training data 404 may be linked to descriptors of categories by tags, tokens, or other data elements; for instance, and without limitation, training data 404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 4, training data 404 may include one or more elements that are not categorized; that is, training data 404 may not be formatted or contain descriptors for some elements of data. Machine-learning algorithms and/or other processes may sort training data 404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 404 to be made applicable for two or more distinct machine-learning algorithms as described in further detail below. Training data 404 used by machine-learning module 400 may correlate any input data as described in this disclosure to any output data as described in this disclosure. As a non-limiting illustrative example input data may include attribute data tables and output data may include matching opportunity postings.

Further referring to FIG. 4, training data may be filtered, sorted, and/or selected using one or more supervised and/or unsupervised machine-learning processes and/or models as described in further detail below; such models may include without limitation a training data classifier 416. Training data classifier 416 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 400 may generate a classifier using a classification algorithm, defined as a processes whereby a computing device and/or any module and/or component operating thereon derives a classifier from training data 404. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to categories of opportunity postings.

Still referring to FIG. 4, machine-learning module 400 may be configured to perform a lazy-learning process 420 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 404. Heuristic may include selecting some number of highest-ranking associations and/or training data 404 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 4, machine-learning processes as described in this disclosure may be used to generate machine-learning models 424. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 424 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 424 may be generated by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, machine-learning algorithms may include at least a supervised machine-learning process 428. At least a supervised machine-learning process 428, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include attribute data tables as described above as inputs, matching opportunity postings as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 404. Persons skilled in the art, upon reviewing the entirety of this disclosure, will be aware of various possible variations of at least a supervised machine-learning process 428 that may be used to determine relation between inputs and outputs. Supervised machine-learning processes may include classification algorithms as defined above.

Further referring to FIG. 4, machine learning processes may include at least an unsupervised machine-learning processes 432. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 4, machine-learning module 400 may be designed and configured to create a machine-learning model 424 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 5:
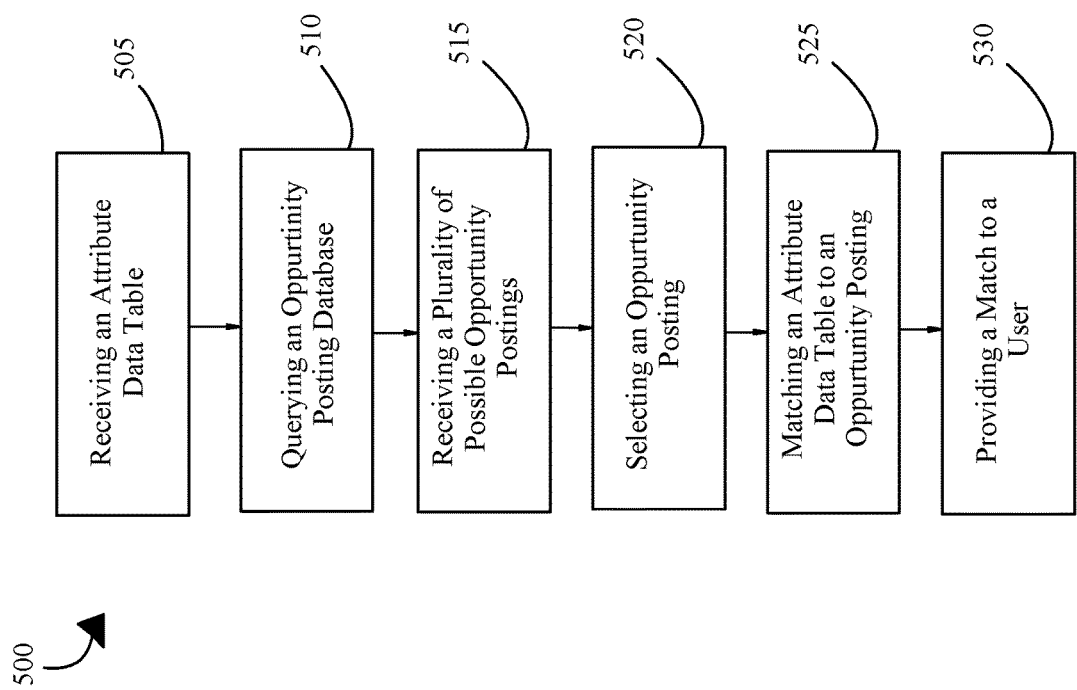
FIG. 5 is flowchart of a method for attribute data table matching.

Referring now to FIG. 5, a method 500 of attribute data table matching is presented. At step 505, method 500 includes receiving an attribute data table. An attribute data table may include a data structure including attributes of an individual. An attribute data table may be received from a user at a processor communicatively connected to a memory. This step may be implemented without limitation as described in FIGS. 1-4.

Still referring to FIG. 5, at step 510, method 500 includes querying an opportunity posting database. An opportunity posting database may be queried as a function of a received attribute data table. This step may be implemented without limitation as described in FIGS. 1-4.

Still referring to FIG. 5, at step 515, method 500 includes receiving a plurality of possible opportunity postings. This step may be implemented without limitation as described in FIGS. 1-4.

Still referring to FIG. 5, at step 520, method 500 includes selecting an opportunity posting. An opportunity posting may be selected from an opportunity posting database. In some embodiments, an opportunity posting may be selected as a function of at least an attribute data table criterion. This step may be implemented without limitation as described in FIGS. 1-4.

Still referring to FIG. 5, at step 525, method 500 includes matching an attribute data table to an opportunity posting. An opportunity data table may be matched to an opportunity posting as a function of at least an attribute data table criterion. This step may be implemented without limitation as described in FIGS. 1-4.

Still referring to FIG. 5, at step 530, method 500 includes providing a match of an attribute data table to a user. A match may be provided through, but not limited to, a GUI of a laptop, desktop, tablet, smartphone, and the like. In some embodiments, a match may be provided through push notifications to a user. This step may be implemented without limitation as described in FIGS. 1-4.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 6:
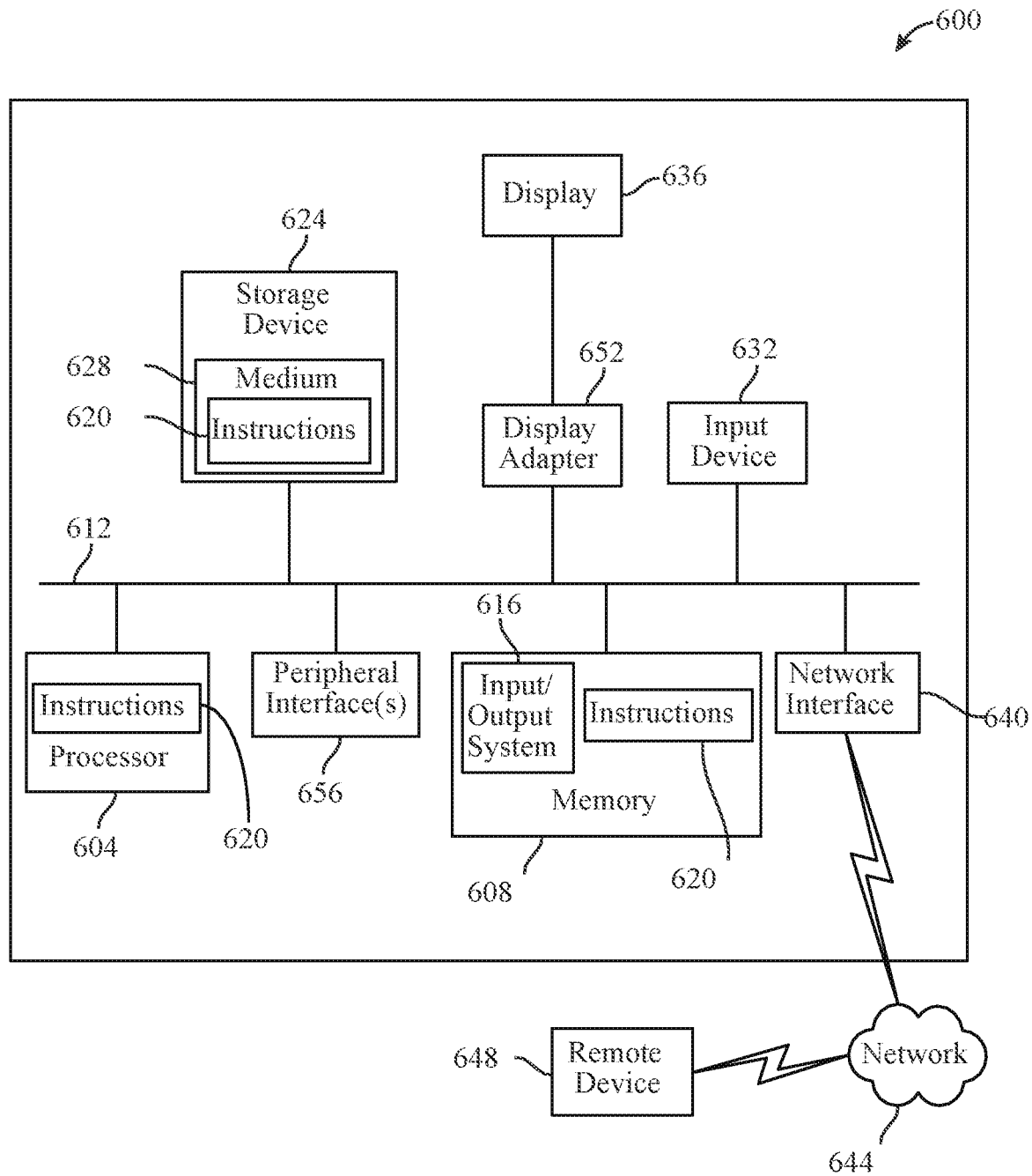
FIG. 6 is a block diagram of a computing system that can be used to implement any one or more of the methodologies disclosed herein and any one or more portions thereof.

FIG. 6 shows a diagrammatic representation of one embodiment of a computing device in the exemplary form of a computer system 600 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 600 includes a processor 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Still referring to FIG. 6, processor 604 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 604 may be organized according to Von Neumann and/or Harvard architecture as a non-limiting example. Processor 604 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Still referring to FIG. 6, memory 608 may include various components (e.g., machine-readable media) including, but not limited to, a random-access memory component, a read only component, and any combinations thereof. In one example, a basic input/output system 616 (BIOS), including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Still referring to FIG. 6, computer system 600 may also include a storage device 624. Examples of a storage device (e.g., storage device 624) include, but are not limited to, a hard disk drive, a magnetic disk drive, an optical disc drive in combination with an optical medium, a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, software 620 may reside, completely or partially, within machine-readable medium 628. In another example, software 620 may reside, completely or partially, within processor 604.

Still referring to FIG. 6, computer system 600 may also include an input device 632. In one example, a user of computer system 600 may enter commands and/or other information into computer system 600 via input device 632. Examples of an input device 632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 632 may be interfaced to bus 612 via any of a variety of interfaces (not shown) including, but not limited to, a serial interface, a parallel interface, a game port, a USB interface, a FIREWIRE interface, a direct interface to bus 612, and any combinations thereof. Input device 632 may include a touch screen interface that may be a part of or separate from display 636, discussed further below. Input device 632 may be utilized as a user selection device for selecting one or more graphical representations in a graphical interface as described above.

Still referring to FIG. 6, a user may also input commands and/or other information to computer system 600 via storage device 624 (e.g., a removable disk drive, a flash drive, etc.) and/or network interface device 640. A network interface device, such as network interface device 640, may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 644, may employ a wired and/or a wireless mode of communication. In general, any network topology may be used. Information (e.g., data, software 620, etc.) may be communicated to and/or from computer system 600 via network interface device 640.

Still referring to FIG. 6, computer system 600 may further include a video display adapter 652 for communicating a displayable image to a display device, such as display device 636. Examples of a display device include, but are not limited to, a liquid crystal display (LCD), a cathode ray tube (CRT), a plasma display, a light emitting diode (LED) display, and any combinations thereof. Display adapter 652 and display device 636 may be utilized in combination with processor 604 to provide graphical representations of aspects of the present disclosure. In addition to a display device, computer system 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve apparatuses, methods, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for attribute data table matching, the apparatus comprising:
at least a processor; and
a memory communicatively connected to the processor, the memory containing instructions configuring the at least a processor to:
receive an attribute data table from a user, wherein the attribute data table comprises a plurality of video elements that represent attributes of a subject, wherein the attributes include qualifications of the user comprising a skill level metric;
query an opportunity posting database as a function of the received attribute data table and a target video resume, wherein the query comprises giving a weight to each of the attributes of the attribute table based on prior queries;
receive a plurality of possible opportunity postings from the opportunity posting database as a function of the query;
select an opportunity posting of the opportunity posting database as a function of at least an attribute data table criterion;
match the attribute data table to the opportunity posting utilizing index training data, wherein the index training data comprises attribute data, wherein the attribute data comprises at least a plurality of objectives of the user, and wherein the at least a plurality of objectives of the user is correlated to one or more opportunity postings; and
provide the match of the attribute data table to the user.

2. The apparatus of claim 1, wherein the at least a processor is further configured to:
prompt the user with attribute inquiries pertaining to opportunities;
record user data from the user as a function of the prompt; and
generate an attribute data table as a function of the response of the user.

3. The apparatus of claim 2, wherein the at least a processor is further configured to utilize a speech recognition model to generate the attribute data table as a function of the response of the user.

4. The apparatus of claim 1, wherein the at least a processor is further configured to utilize an optimization model to determine the match of the attribute data table to the opportunity posting.

5. The apparatus of claim 1, wherein the at least a processor is further configured to implement a fuzzy logic system to query the opportunity posting database.

6. The apparatus of claim 1, wherein the at least a processor is further configured to provide a ranked list of attribute data table matches to the user as a function of a user preference.

7. The apparatus of claim 1, wherein matching the attribute data table to the opportunity posting comprises utilizing a classification model to classify opportunity postings to opportunity posting categories.

8. The apparatus of claim 6, wherein the at least a processor is further configured to determine a likelihood of a match as a function of the opportunity posting categories.

9. The apparatus of claim 1, wherein the at least a processor is further configured to generate a web crawler function to populate the opportunity posting database.

10. The apparatus of claim 1, wherein the at least a processor is further configured to:
receive training data, wherein the training data correlates attribute data tables as inputs and opportunity posting matches as output;
train an opportunity matching machine-learning model with the training data, wherein the opportunity matching machine-learning model is configured to input attribute data tables and output opportunity posting matches; and
determine a match of an attribute data table to an opportunity posting as a function of at least an output of the matching machine-learning model.

11. A method for attribute data table matching, comprising:
receiving an attribute data table from a user at a processor communicatively connected to a memory, wherein the attribute data table comprises a plurality of video elements that represent attributes of a subject, wherein the attributes include qualifications of the user comprising a skill level metric;

querying, via the processor, an opportunity posting database as a function of the received attribute data table and a target video resume, wherein querying comprises giving a weight to each of the attributes of the attribute table based on prior queries;

receiving, via the query, a plurality of possible opportunity postings from the opportunity posting database;

selecting, via the processor, an opportunity posting of the opportunity posting database as a function of at least an attribute data table criterion;

matching, via the processor, the attribute data table to the opportunity posting utilizing index training data, wherein the index training data comprises attribute data, wherein the attribute data comprises at least a plurality of objectives of the user, wherein the at least a plurality of objectives of the user is correlated to one or more opportunity postings; and providing, via the processor, the match of the attribute data table to the user.

12. The method of claim 11, wherein receiving the attribute data table from the user further comprises:
prompting the user with attribute inquiries pertaining to opportunities;
recording user data from the user as a function of the prompt; and
generating an attribute data table as a function of the response of the user.

13. The method of claim 12, wherein generating the attribute data table further comprises utilizing a speech recognition model.

14. The method of claim 11, wherein matching further comprises utilizing an optimization model to determine the match of the attribute data table to the opportunity posting.

15. The method of claim 11, wherein querying further comprises implementing a fuzzy logic system to query the opportunity posting database.

16. The method of claim 11, wherein providing further comprises providing a ranked list of attribute data table matches to the user as a function of a user preference.

17. The method of claim 11, wherein matching further comprises utilizing a classification model to classify opportunity postings to opportunity posting categories.

18. The method of claim 16, wherein matching further comprises determining a likelihood of a match as a function of the opportunity posting categories.

19. The method of claim 11, wherein querying further comprises generating a web crawler function to query opportunity postings of the opportunity posting database.

20. The method of claim 11, wherein querying further comprises generating a search index as a function of the query.

21. The method of claim 11, wherein matching further comprises:
receiving training data, wherein the training data correlates attribute data tables as inputs and opportunity posting matches as output;
training an opportunity matching machine-learning model with the training data, wherein the opportunity matching machine-learning model is configured to input attribute data tables and output opportunity posting matches; and
determining a match of an attribute data table to an opportunity posting as a function of at least an output of the matching machine-learning model.

* * * * *